(12) United States Patent
Takenaka et al.

(10) Patent No.: US 11,844,734 B2
(45) Date of Patent: Dec. 19, 2023

(54) MOBILE BODY

(71) Applicant: HONDA MOTOR CO., LTD., Tokyo (JP)

(72) Inventors: Toru Takenaka, Saitama (JP); Shinichiro Kobashi, Saitama (JP); Seiji Kato, Saitama (JP); Takeshi Echizenya, Saitama (JP); Makoto Hasegawa, Saitama (JP); Masaki Goto, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 414 days.

(21) Appl. No.: 17/252,198

(22) PCT Filed: Apr. 5, 2019

(86) PCT No.: PCT/JP2019/015163
§ 371 (c)(1),
(2) Date: Dec. 14, 2020

(87) PCT Pub. No.: WO2019/244444
PCT Pub. Date: Dec. 26, 2019

(65) Prior Publication Data
US 2021/0251826 A1    Aug. 19, 2021

(30) Foreign Application Priority Data

Jun. 20, 2018 (JP) .................................. 2018-116959

(51) Int. Cl.
*A61G 5/04* (2013.01)
*B62K 11/00* (2006.01)
*A61G 5/10* (2006.01)

(52) U.S. Cl.
CPC ............ *A61G 5/043* (2013.01); *A61G 5/1075* (2013.01); *A61G 5/1089* (2016.11); *B62K 11/007* (2016.11); *A61G 2203/42* (2013.01)

(58) Field of Classification Search
CPC .... A61G 5/043; A61G 5/1089; A61G 5/1075; A61G 2203/42; B62K 11/007
See application file for complete search history.

(56) References Cited

U.S. PATENT DOCUMENTS

| 9,027,693 B2 | 5/2015 | Muto et al. |
| 2001/0020556 A1* | 9/2001 | Kamen .................... A61G 5/04 |
| | | 180/209 |

(Continued)

FOREIGN PATENT DOCUMENTS

| EP | 1023027 A1 | 8/2000 |
| JP | 2000-514680 | 11/2000 |

(Continued)

OTHER PUBLICATIONS

European Search Report dated Jun. 28, 2021, 8 pages.
International Search Report, dated Sep. 7, 2019, 2 pages.

*Primary Examiner* — Tony H Winner
(74) *Attorney, Agent, or Firm* — Rankin, Hill & Clark LLP

(57) ABSTRACT

A mobile body (1A) includes: a base body (3) tiltably assembled to a movement operation section (2) that can move on a floor surface; an occupant riding section 6 installed to the base body (3) by a connection mechanism (4); an auxiliary ground contact section 7 connected to the occupant riding section (6) and in contact with the floor surface in a slidable or rollable manner when a tilt amount of the occupant riding section (6) with respect to the floor surface increases to a predetermined amount; and a control device (80) which controls the movement of the movement operation section (2) to stabilize the attitude of the mobile (Continued)

body (1A). The connection mechanism (4) elastically rocks the occupant riding section (6) with respect to the base body (3) according to the movement of the center of gravity of a user P riding on the occupant riding section (6).

21 Claims, 24 Drawing Sheets

(56) References Cited

U.S. PATENT DOCUMENTS

| | | | | |
|---|---|---|---|---|
| 2008/0169136 A1* | 7/2008 | Meyer | ............... | A61G 5/06 |
| | | | | 180/15 |
| 2008/0208394 A1* | 8/2008 | Fought | ............... | A61G 5/06 |
| | | | | 701/1 |
| 2012/0080244 A1* | 4/2012 | Hou | ............... | B62K 3/002 |
| | | | | 180/24.07 |
| 2017/0213477 A1 | 7/2017 | Honeycutt et al. | | |
| 2018/0008493 A1* | 1/2018 | Danielsson | ............... | A61G 5/06 |

FOREIGN PATENT DOCUMENTS

| | | |
|---|---|---|
| JP | 2001-519209 | 10/2001 |
| JP | 2007-176398 | 7/2007 |
| JP | 2015-083412 | 4/2015 |
| JP | 5922489 | 4/2016 |
| JP | 2018-192843 | 12/2018 |

\* cited by examiner

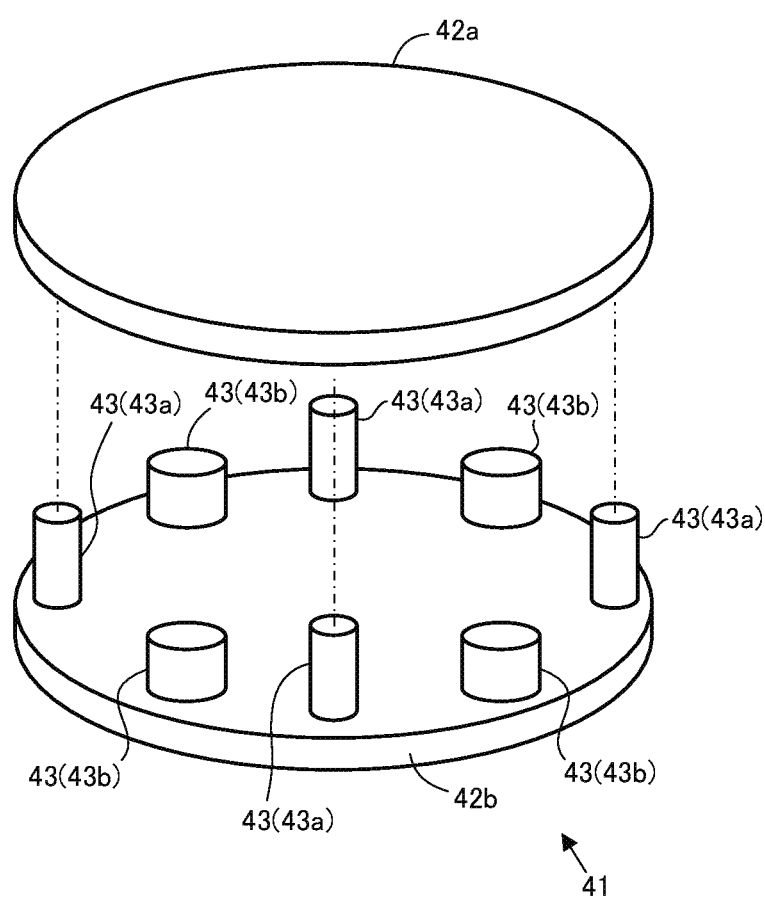

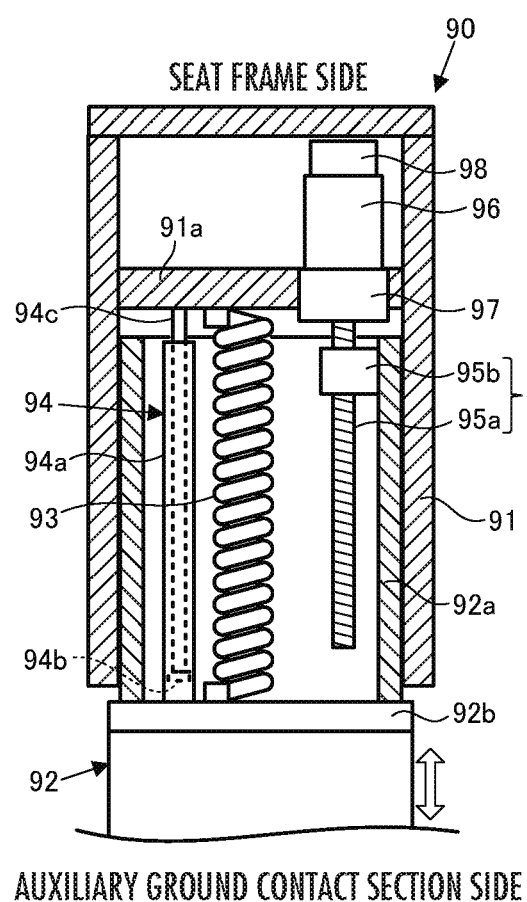

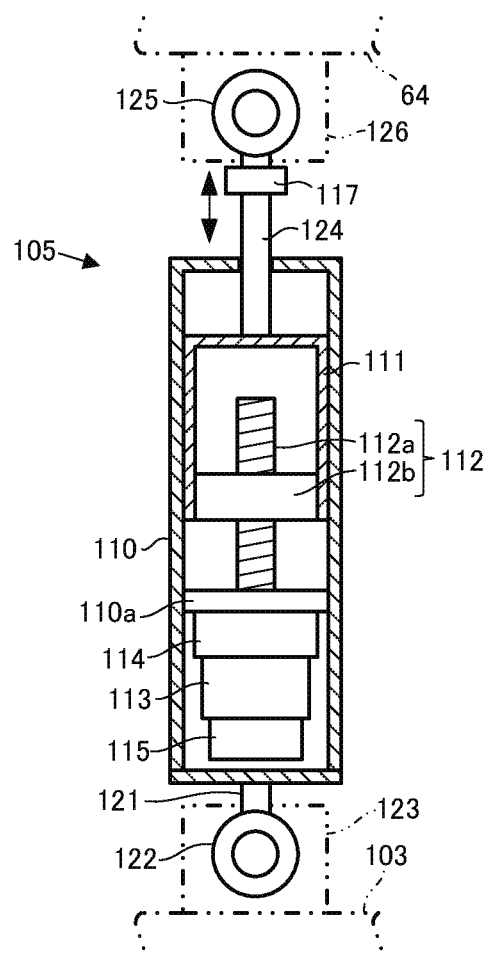

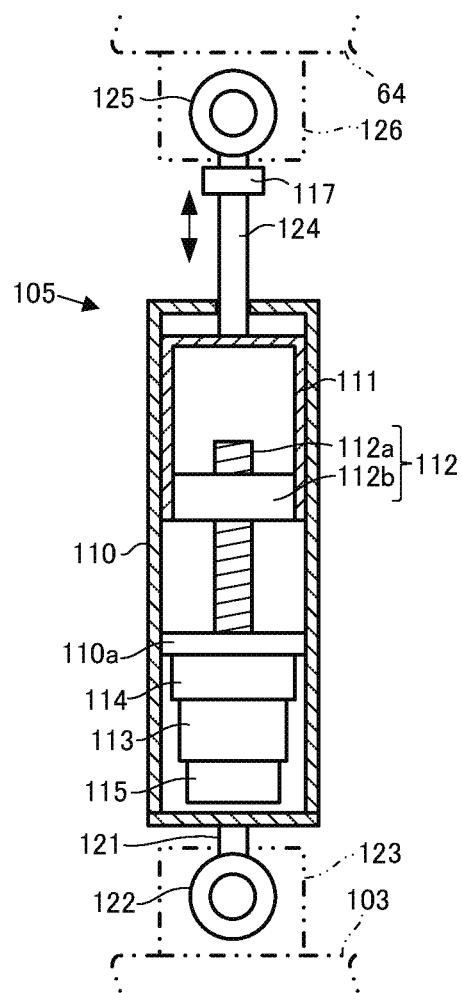

MOBILE BODY

TECHNICAL FIELD

The present invention relates to a mobile body that can move on a floor surface in response to tilting of an occupant riding section.

BACKGROUND ART

Hitherto, as disclosed in, for example, Patent Literatures 1 and 2, there has been known an inverted pendulum type mobile body as a mobile body that can move on a floor surface in response to tilting of an occupant riding section. Further, as this type of a mobile body, there has been known a mobile body that prevents further tilting of an occupant riding section by bringing auxiliary wheels, which extend outward from the occupant riding section to the front or the back, into contact with a floor surface when the occupant riding section significantly tilts forward or rearward (when the amount of forward tilt or the amount of rearward tilt significantly increases), as disclosed in, for example, Patent Literature 3.

CITATION LIST

Patent Literature

Patent Literature 1: Japanese Patent No. 5922489
Patent Literature 2: U.S. Pat. No. 9,027,693
Patent Literature 3: Japanese Unexamined Patent Application Publication (Translation of PCT Application) No. 2000-514680

SUMMARY OF INVENTION

The mobile body described in the foregoing Patent Literature 3 is provided with a mechanism for preventing an excessive increase in the amount of forward tilt or the amount of rearward tilt of an occupant riding section, as described above. However, in such a mobile body, if the wheels (the movement operation section that moves on a floor surface) of the mobile body are driven to stabilize the attitude of the mobile body (to balance the overall center of gravity of the mobile body including an occupant like the mass point of an inverted pendulum) by the control method disclosed in, for example, Patent Literatures 1 and 2, then an inconvenience described below may arise.

If, for example, an occupant riding on a mobile body tilts his or her upper body relatively significantly toward the front in order to move the mobile body forward, then the overall center of gravity of the mobile body moves forward, thus causing a movement operation section in contact with a floor surface to quickly move forward toward a point directly under the overall center of gravity.

At this time, in the mobile body having the structure as disclosed in Patent Literature 3, the occupant riding section may tilt in a rearward direction by inertia, causing the auxiliary wheels on the back side of the occupant riding section to come in contact with a floor surface. In such a state, further rearward tilt of the occupant riding section is inconveniently limited, thus causing the movement operation section to accelerate further in the forward direction. This may result in an excessive increase in the moving speed of the mobile body.

Such an inconvenience may also arise in the mobile bodies disclosed in Patent Literatures 1 and 2, and particularly in the case where the mechanism as disclosed in Patent Literature 3 is adopted.

The present invention has been made in view of the background described above, and an object of the invention is to provide a mobile body that can prevent an occupant riding section from excessively tilting while securing a capability for smooth movement.

To this end, a mobile body in accordance with the present invention includes:

a movement operation section capable of moving on a floor surface;

a base body assembled to the movement operation section in such a manner as to be tiltable with respect to the floor surface;

an occupant riding section mounted to the base body through the intermediary of a connection mechanism such that the occupant riding section can rock with respect to the base body;

an auxiliary ground contact section which is connected to the occupant riding section in such a manner as to tilt together with the occupant riding section with respect to the floor surface, which is placed in a state in which a ground contact load for preventing further tilting of the occupant riding section can be generated in the case where an amount of tilting of the occupant riding section with respect to the floor surface increases to a predetermined amount, and which is configured to be capable of sliding or rolling on the floor surface in the state; and a stabilization control device which controls the movement of the movement operation section such that an attitude of at least the mobile body is stabilized in a state in which an occupant is riding on the occupant riding section, wherein the connection mechanism is configured to elastically rock the occupant riding section with respect to the base body according to the movement of a center of gravity of the occupant riding on the occupant riding section (a first aspect of the invention).

In the present invention, the phrase "elastically rock the occupant riding section with respect to the base body" means to rock the occupant riding section with respect to the base body such that a restoring force in a direction for returning the attitude of the occupant riding section with respect to the base body to a reference attitude is generated according to the amount of rocking of the occupant riding section (the amount of rocking with respect to the base body). Further, the phrase "the floor surface" in the present invention is not limited to a floor surface in the normal sense, and may include a road surface or a ground surface.

According to the first aspect of the invention, the connection mechanism is configured to elastically rock the occupant riding section with respect to the base body according to the movement of the center of gravity of an occupant riding on the occupant riding section. Thus, in the case where the base body tilts in a certain direction as the movement of the movement operation section is controlled by the stabilization control device, the occupant riding section can rock with respect to the base body in the opposite direction from the tilt. For example, even if the base body tilts rearward as the movement operation section is controlled to move in the forward direction, the occupant riding section can be rocked to tilt forward with respect to the base body as the center of gravity of the occupant moves in the forward direction.

Consequently, it is possible to prevent the auxiliary ground contact section from coming in contact with a floor surface to block the tilting of the base body as the movement of the movement operation section is controlled. Hence, the control of the movement of the movement operation section by the stabilization control device can be properly performed while securing the state in which the tilting of the base body is not blocked.

Further, when the amount of tilting of the occupant riding section with respect to a floor surface increases to a predetermined amount, the state is set, in which the auxiliary ground contact section generates the ground contact load for preventing further tilting of the occupant riding section, thus preventing further tilting of the occupant riding section. Consequently, according to the first aspect of the invention, it is possible to prevent excessive tilting of the occupant riding section while securing the capability for smooth movement of the mobile body.

In the present invention, as the stabilization control device, a control device may be adopted, which performs control of the movement of the movement operation section such that the overall center of gravity of the mobile body including, for example, an occupant or other arbitrary mounted object can be balanced. As a more specific control method in this case, a method may be adopted, in which, for example, the movement of the movement operation section is controlled such that the overall center of gravity is converged to a position directly above the central point of floor reaction force of the ground contact part of the movement operation section. However, the stabilization control device may adopt other control method insofar as the control method enables the attitude of at least a mobile body to be stabilized.

Supplementally, the present invention may adopt either one of a mode in which the auxiliary ground contact section is connected to the occupant riding section such that there is a segment (hereinafter referred to as "play") in which a vertical movement of the auxiliary ground contact section is not transmitted to the riding section or a mode in which the auxiliary ground contact section is connected to the occupant riding section such that there is no such play. In the case where the auxiliary ground contact section is connected to the occupant riding section to allow the play, the behavior of the attitude of the occupant riding section will be the same behavior observed in the case where the auxiliary ground contact section is fixed in a state in which the auxiliary ground contact section is pressed against the upper end of the play (a state in which the auxiliary ground contact section is placed closest to the occupant riding section in the play segment).

Hence, in the following description of the present invention, the present invention will be described in the assumption that, unless otherwise specified, the auxiliary ground contact section is in the state in which the auxiliary ground contact section is pressed against the upper end of the play in a mobile body in which the auxiliary ground contact section has the play. Consequently, in the following description of the present invention, in a mobile body in which the auxiliary ground contact section has the play, the phrase "the auxiliary ground contact section is in contact with the ground" means that "the auxiliary ground contact section is in contact with the ground and the auxiliary ground contact section abuts against the upper end of the play." The same applies to "a ground contact state of the auxiliary ground contact section." Further, the phrase "the auxiliary ground contact section approaches a floor" means that "the auxiliary ground contact section is in contact with the ground and the auxiliary ground contact section approaches the upper end of the play." In the first aspect of the invention, the state in which the auxiliary ground contact section generates the ground contact load for preventing further tilting of the occupant riding section is the state in which the auxiliary ground contact section is in contact with the ground in the foregoing meaning in a mobile body in which the auxiliary ground contact section has the play.

In the foregoing first aspect of the invention, the connection mechanism can adopt a mode in which the connection mechanism is provided with an elastic member as a constituent element for elastically rocking the occupant riding section with respect to the base body (a second aspect of the invention).

According to this arrangement, the connection mechanism can be configured at relatively low cost.

Further, the connection mechanism can adopt a mode in which the connection mechanism is provided with a rocking actuator, which operates to rock the occupant riding section with respect to the base body according to a load acting on the occupant riding section, as a constituent element for elastically rocking the occupant riding section with respect to the base body (a third aspect of the invention).

According to this arrangement, a desired elastic characteristic (an elastic characteristic related to the rocking of the occupant riding section with respect to the base body) of the connection mechanism can be implemented in a pseudo manner by controlling the operation of the rocking actuator.

In the first to the third aspects of the invention described above, the auxiliary ground contact section is preferably configured such that a braking force is applied in the case where the auxiliary ground contact section slides or rolls on the floor surface (a fourth aspect of the invention).

With this arrangement, when the movement operation section moves, if tilting of the occupant riding section causes the auxiliary ground contact section to generate the ground contact load, then the sliding or rolling motion of the auxiliary ground contact section is braked, so that the movement of the movement operation section is also braked. This enables the movement of the movement operation section to quickly stop. The braking force acting on the auxiliary ground contact section is desirably adjustable according to the state of a floor surface or the moving speed or the like of a mobile body.

In the first to the fourth aspects of the invention, in the case where the occupant riding section can be tilted in a pitch direction with respect to the floor surface, the auxiliary ground contact section is preferably disposed each at the front and rear of the occupant riding section (a fifth aspect of the invention).

The foregoing "pitch direction" means a direction around an axis in the lateral direction of the occupant riding section. According to the fifth aspect of the invention, it is possible to properly prevent the occupant riding section from excessively tilting forward or rearward with respect to a floor surface.

Further, in the first to the fifth aspects of the invention, in the case where the occupant riding section can be tilted in a rolling direction with respect to the floor surface, the auxiliary ground contact section is preferably disposed each on a left side and a right side of the occupant riding section (a sixth aspect of the invention).

The foregoing "rolling direction" means a direction around an axis in the longitudinal direction of the occupant riding section. According to the sixth aspect of the invention, it is possible to properly prevent the occupant riding section from excessively tilting rightward or leftward with respect to a floor surface.

In the first to the sixth aspects of the invention, the connection mechanism can be configured so as to be capable of relatively raising/lowering the occupant riding section with respect to the base body in addition to elastically rocking the occupant riding section with respect to the base body (a seventh aspect of the invention).

According to this arrangement, the height of the occupant riding section or the auxiliary ground contact section from a floor surface in the state in which the movement operation section is in contact with the floor surface can be adjusted. Alternatively, the predetermined amount of a tilting amount that sets the state in which the auxiliary ground contact section generates the ground contact load for preventing further tilting of the occupant riding section can be adjusted.

In the seventh aspect of the invention described above, the connection mechanism can adopt a mode in which the connection mechanism includes an expandable elastic member interposed between the occupant riding section and the base body as a constituent element for elastically rocking the occupant riding section with respect to the base body, and is configured to enable the occupant riding section to be relatively raised/lowered with respect to the base body by expansion/contraction of the elastic member (an eighth aspect of the invention).

This arrangement makes it possible to easily configure the connection mechanism for achieving the raising/lowering and the elastic rocking of the occupant riding section with respect to the base body.

In the seventh or the eighth aspect of the invention, the auxiliary ground contact section is preferably configured such that the auxiliary ground contact section is connected to the occupant riding section so as to approach the floor surface and comes in contact with the floor surface as the occupant riding section relatively lowers with respect to the base body, and that the auxiliary ground contact section supports the occupant riding section, while maintaining the attitude of the occupant riding section with respect to the floor surface to be constant in a state in which the auxiliary ground contact section is in contact with the floor surface (a ninth aspect of the invention).

With this arrangement, when, for example, an occupant gets on or off the occupant riding section, the attitude of the occupant riding section with respect to a floor surface can be maintained to be constant by relatively lowering the occupant riding section with respect to the base body and by bringing the auxiliary ground contact section into contact with the floor surface. This enables the occupant to easily get on or off.

Alternatively, if, for example, an abnormality or the like takes place while a mobile body is moving, the attitude of the occupant riding section with respect to a floor surface can be maintained to be constant by relatively lowering the occupant riding section with respect to the base body and by bringing the auxiliary ground contact section into contact with the floor surface. This enables the attitude of the mobile body to be reliably stabilized.

In the ninth aspect of the invention described above, the mobile body preferably further includes a first spring member connected to the base body and the occupant riding section so as to urge the base body in a direction for being relatively raised with respect to the occupant riding section in a state in which the auxiliary ground contact section is brought into contact with the ground by relative lowering of the occupant riding section with respect to the base body (a tenth aspect of the invention).

According to this arrangement, in the state in which the occupant riding section relatively lowers with respect to the base body, causing the auxiliary ground contact section to be in contact with the ground, the ground contact load acting on the movement operation section from the floor surface can be reduced to be small or it will be possible to prevent the ground contact load from acting on the movement operation section. As a result, when, for example, the occupant gets on or off the occupant riding section, in the state in which the occupant riding section relatively lowers with respect to the base body, causing the auxiliary ground contact section to be in contact with the ground, it will be possible to prevent the mobile body from moving or make it difficult for the mobile body to move even when the drive of the movement operation section is started. In addition, the static stability of the mobile body is enhanced. The static stability of the mobile body means the ease of maintaining the stability of the attitude of the mobile body when an external moment acts on the mobile body.

In the ninth to the tenth aspects of the invention described above, the connection mechanism is preferably configured such that rigidity thereof related to the rocking of the occupant riding section with respect to the base body is lower in the state in which the auxiliary ground contact section is in contact with the ground due to the relative lowering of the occupant riding section with respect to the base body than in the state in which the auxiliary ground contact section is not in contact with the floor surface (an eleventh aspect of the invention). The state in which the auxiliary ground contact section is not in contact with the floor surface means a state in which the auxiliary ground contact section is off the floor surface or is positioned in the play segment.

Here, when an attempt is made to relatively raise the occupant riding section with respect to the base body in order to start the movement of the mobile body by the drive of the movement operation section from the state in which the auxiliary ground contact section is in contact with the ground due to the relative lowering of the occupant riding section with respect to the base body, the occupant riding section cannot or can hardly tilt with respect to the floor surface in the vicinity of clearing the state in which the auxiliary ground contact section is in contact with the ground at the time of, for example, the auxiliary ground contact section starting to rise off the floor surface. For this reason, if the rigidity related to the rocking of the occupant riding section with respect to the base body were high, then it would be difficult for the base body to tilt with respect to the floor surface.

On the other hand, according to the eleventh aspect of the invention, the rigidity in the vicinity of clearing the state in which the auxiliary ground contact section is in contact with the ground can be made lower. This makes it easy for the base body to tilt with respect to the floor surface even if the occupant riding section cannot or can hardly tilt with respect to the floor surface.

As a result, even if the drive of the movement operation section is started in the vicinity of clearing the state in which the auxiliary ground contact section is in contact with the ground, the base body can tilt with respect to the floor surface with high responsiveness as the movement operation section moves. This enables the drive of the movement operation section to be smoothly started.

In the seventh to the eleventh aspects of the invention described above, the mobile body preferably further includes a locking mechanism that locks the relative raising/lowering of the occupant riding section with respect to the base body (a twelfth aspect of the invention).

With this arrangement, the relative height position of the occupant riding section with respect to the base body can be steadily maintained at a required position without the need for servo control or the like of an actuator, such as an electric motor. Further, if an actuator, such as an electric motor, for raising/lowering the occupant riding section with respect to the base body is provided, then the energy consumption of the actuator can be reduced in the state in which the raising/lowering is locked by the locking mechanism.

In the twelfth aspect of the invention described above, preferably, the mobile body further includes a second spring member connected to the base body and the occupant riding section so as to urge the occupant riding section relatively in a lowering direction with respect to the base body, wherein the locking mechanism is configured to release the locking of the raising/lowering of the occupant riding section with respect to the base body in case of occurrence of a predetermined abnormality of the mobile body or in response to an operation through a predetermined operation unit (a thirteenth aspect of the invention).

With this arrangement, in case of the occurrence of an abnormality of the mobile body or in response to the operation through the predetermined operation unit, the locking of the raising/lowering is released, so that the occupant riding section is relatively lowered with respect to the base body by the urging force of the second spring member, causing the auxiliary ground contact section to come in contact with the ground. This makes it possible to maintain the attitude of the occupant riding section to be constant.

In the case where the thirteenth aspect of the invention is combined with the tenth aspect of the invention, the first spring member can be used as the second spring member.

Further, in the first to the sixth aspects of the invention described above, the auxiliary ground contact section may adopt a mode in which the auxiliary ground contact section is connected to the occupant riding section such that the auxiliary ground contact section can relatively move with respect to the occupant riding section in a direction for approaching the floor surface (a fourteenth aspect of the invention). According to the present invention, in the case where the auxiliary ground contact section has the play, the auxiliary ground contact section being capable of relative movement with respect to the occupant riding section in the direction for approaching the floor surface means that the auxiliary ground contact section is capable of relatively moving with respect to the occupant riding section in the direction for approaching the floor surface in a state in which the auxiliary ground contact section is positioned at the upper end of the play segment.

This arrangement makes it possible to adjust the height of the auxiliary ground contact section from the floor surface in the state in which the movement operation section is in contact with the floor surface. Alternatively, the predetermined amount of tilting amount that sets the state, in which the auxiliary ground contact section generates the ground contact load that prevents further tilting of the occupant riding section, can be adjusted.

In the fourteenth aspect of the invention described above, preferably, the auxiliary ground contact section is connected to the occupant riding section in such a manner as to be enabled to come in contact with the floor surface by the relative movement with respect to the occupant riding section, and the auxiliary ground contact section is configured to support the occupant riding section, maintaining the attitude of the occupant riding section to be constant with respect to the floor surface in the state in which the auxiliary ground contact section is in contact with the floor surface (a fifteenth aspect of the invention).

With this arrangement, when, for example, an occupant gets on/off the occupant riding section, the attitude of the occupant riding section with respect to the floor surface can be maintained to be constant by bringing the auxiliary ground contact section into contact with the floor surface by relatively moving the auxiliary ground contact section with respect to the occupant riding section. Consequently, the getting on/off can be easily performed.

Alternatively, if, for example, an abnormality or the like takes place while a mobile body is moving, the attitude of the occupant riding section with respect to the floor surface can be maintained to be constant by relatively moving the auxiliary ground contact section with respect to the occupant riding section to bring the auxiliary ground contact section into contact with the floor surface. This consequently enables the attitude of the mobile body to be reliably stabilized.

In the fifteenth aspect of the invention described above, the mobile body preferably further includes a first spring member connected to the auxiliary ground contact section and the occupant riding section in such a manner as to urge the occupant riding section in a direction in which the occupant riding section is relatively raised with respect to the auxiliary ground contact section in a state in which the auxiliary ground contact section is in contact with the ground by the relative movement of the auxiliary ground contact section with respect to the occupant riding section (a sixteenth aspect of the invention).

According to this arrangement, in the state in which the auxiliary ground contact section is in contact with the ground due to the relatively movement of the auxiliary ground contact section with respect to the occupant riding section, the ground contact load acting on the movement operation section from the floor surface can be reduced to be small or it will be possible to prevent the ground contact load from acting on the movement operation section. Consequently, when, for example, the occupant gets on or off the occupant riding section, in the state in which the auxiliary ground contact section is in contact with the ground due to the relative movement of the auxiliary ground contact section with respect to the occupant riding section, it will be possible to prevent the mobile body from moving or make it difficult for the mobile body to move even when the drive of the movement operation section is started. In addition, the static stability of the mobile body is enhanced.

In the fifteenth or the sixteenth aspect of the invention described above, the connection mechanism is preferably configured such that rigidity thereof related to the rocking of the occupant riding section with respect to the base body is lower in a state in which the auxiliary ground contact section is in contact with the ground due to the relative movement of the auxiliary ground contact section with respect to the occupant riding section than in a state in which the auxiliary ground contact section is not in contact with the floor surface (a seventeenth aspect of the invention). The state in which the auxiliary ground contact section is not in contact with the floor surface means a state in which the auxiliary ground contact section is off the floor surface or is positioned in the play segment.

Here, when an attempt is made to relatively move the auxiliary ground contact section with respect to the occupant riding section so as to clear the state in which the auxiliary ground contact section is in contact with the ground in order to start the movement of the mobile body by the drive of the movement operation section from the state in which the auxiliary ground contact section is in contact with the ground due to the relative movement of the auxiliary ground contact section with respect to the occupant riding section, the occupant riding section cannot or can hardly tilt with respect to the floor surface in the vicinity of clearing the state in which the auxiliary ground contact section is in contact with the ground at the time of, for example, the auxiliary ground contact section starting to rise off from the floor surface. For this reason, if the rigidity related to the rocking of the occupant riding section with respect to the base body were high, then it would be difficult for the base body to tilt with respect to the floor surface.

On the other hand, according to the seventeenth aspect of the invention, as with the eleventh aspect of the invention, the rigidity in the vicinity of clearing the state in which the auxiliary ground contact section is in contact with the ground can be made lower, thus making it easy for the base body to tilt with respect to the floor surface. As a result, even if the drive of the movement operation section is started in the vicinity of clearing the state in which the auxiliary ground contact section is in contact with the ground, the base body can tilt with respect to the floor surface with high responsiveness as the movement operation section moves. Consequently, the drive of the movement operation section can be smoothly started.

In the fourteenth to the seventeenth aspects of the invention described above, the mobile body preferably further includes a locking mechanism that locks relative movement of the auxiliary ground contact section with respect to the occupant riding section (an eighteenth aspect of the invention). In the present invention, if the auxiliary ground contact section has play, locking the relative movement of the auxiliary ground contact section with respect to the occupant riding section means to prevent the auxiliary ground contact section from relatively moving with respect to the occupant riding section in a state in which the auxiliary ground contact section is at an arbitrary predetermined position in a play segment.

With this arrangement, it is possible to prevent the relative movement (except the movement in the play segment) of the auxiliary ground contact section with respect to the occupant riding section without the need for servo control or the like of an actuator, such as an electric motor. Further, if an actuator, such as an electric motor, for moving the auxiliary ground contact section with respect to the occupant riding section is provided, then the energy consumption of the actuator can be reduced in the state in which the movement is locked by the locking mechanism.

In the eighteenth aspect of the invention described above, preferably, the mobile body further includes a second spring member connected to the auxiliary ground contact section and the occupant riding section so as to urge the occupant riding section in a direction for bringing the auxiliary ground contact section close to the floor surface, wherein the locking mechanism is configured to release the locking of the relative movement of the auxiliary ground contact section with respect to the occupant riding section in case of occurrence of a predetermined abnormality of the mobile body or in response to an operation through a predetermined operation unit (a nineteenth aspect of the invention).

With this arrangement, in case of the occurrence of an abnormality of the mobile body or in response to the operation through the predetermined operation unit, the locking of the movement is released, so that the auxiliary ground contact section relatively moves with respect to the occupant riding section by the urging force of the second spring member, causing the auxiliary ground contact section to come in contact with the ground. This makes it possible to maintain the attitude of the occupant riding section to be constant.

In the case where the nineteenth aspect of the invention is combined with the sixteenth aspect of the invention, the first spring member can be used as the second spring member.

In the first to the nineteenth aspects of the invention described above, the movement operation section can be a movement operation section that can move in all directions on the floor surface (a twentieth aspect of the invention).

This arrangement enables the mobile body to move in any direction on a floor surface.

In the first to the twentieth aspects of the invention, the movement operation section may adopt a mode in which the movement operation section is configured by connecting two movement operation sections that can move in all directions on the floor surface (a twenty-first aspect of the invention).

This arrangement improves the surmountability of the movement operation section over the unevenness of a floor surface and thus leads to higher stability of the mobile body.

Further, a mobile body in accordance with the present invention may adopt a mode in which the mobile body includes: a movement operation section capable of moving on a floor surface;

a base body assembled to the movement operation section in such a manner as to be capable of tilting with respect to the floor surface;

an occupant riding section installed to the base body; and an auxiliary ground contact section which is connected to the occupant riding section in such a manner as to tilt together with the occupant riding section with respect to the floor surface thereby to change a height from the floor surface, which is disposed each at the front and rear of the occupant riding section, and which comes in contact with the floor surface in a slidable or rollable manner so as to prevent the occupant riding section from tilting further in the case where an amount of tilting of the occupant riding section in a forward tilt direction or rearward tilt direction with respect to the floor surface increases to a predetermined amount, wherein the occupant riding section and the auxiliary ground contact section tilt forward and the base body tilt rearward as an advancing speed of the movement operation section increases in a steady state in which the movement operation section advances on the floor surface (a twenty-second aspect of the invention).

This arrangement makes it possible to prevent the auxiliary ground contact section at the rear of the occupant riding section from coming in contact with a floor surface even if the base body tilts rearward while the movement operation section advances. Consequently, it is possible to prevent the rearward tilting of the base body from being interfered with even if the advancing speed of the movement operation section is high. Thus, the movement operation section can smoothly advance.

Further, if the amount of tilting of the occupant riding section in the forward tilt direction or the rearward tilt direction with respect to the floor surface increases to a predetermined amount, the auxiliary ground contact section comes in contact with the floor surface, thereby preventing the occupant riding section from tilting further.

Consequently, according to the twenty-second aspect of the invention, it is possible to prevent the occupant riding section from excessively tilting while securing the performance of smooth movement of the mobile body when advancing.

BRIEF DESCRIPTION OF DRAWINGS

FIG. 4 is an exploded perspective view of an elastic structure of the mobile body according to the first embodiment;

FIG. 12A and FIG. 12B are diagrams illustrating the configuration of each leg mechanism of the mobile body according to the first embodiment in operation states that are different from each other;

FIG. 16A and FIG. 16B are diagrams illustrating the actuator mechanism of the mobile body according to the third embodiment in operation states that are different from each other;

DESCRIPTION OF EMBODIMENTS

First Embodiment

Figure 1:
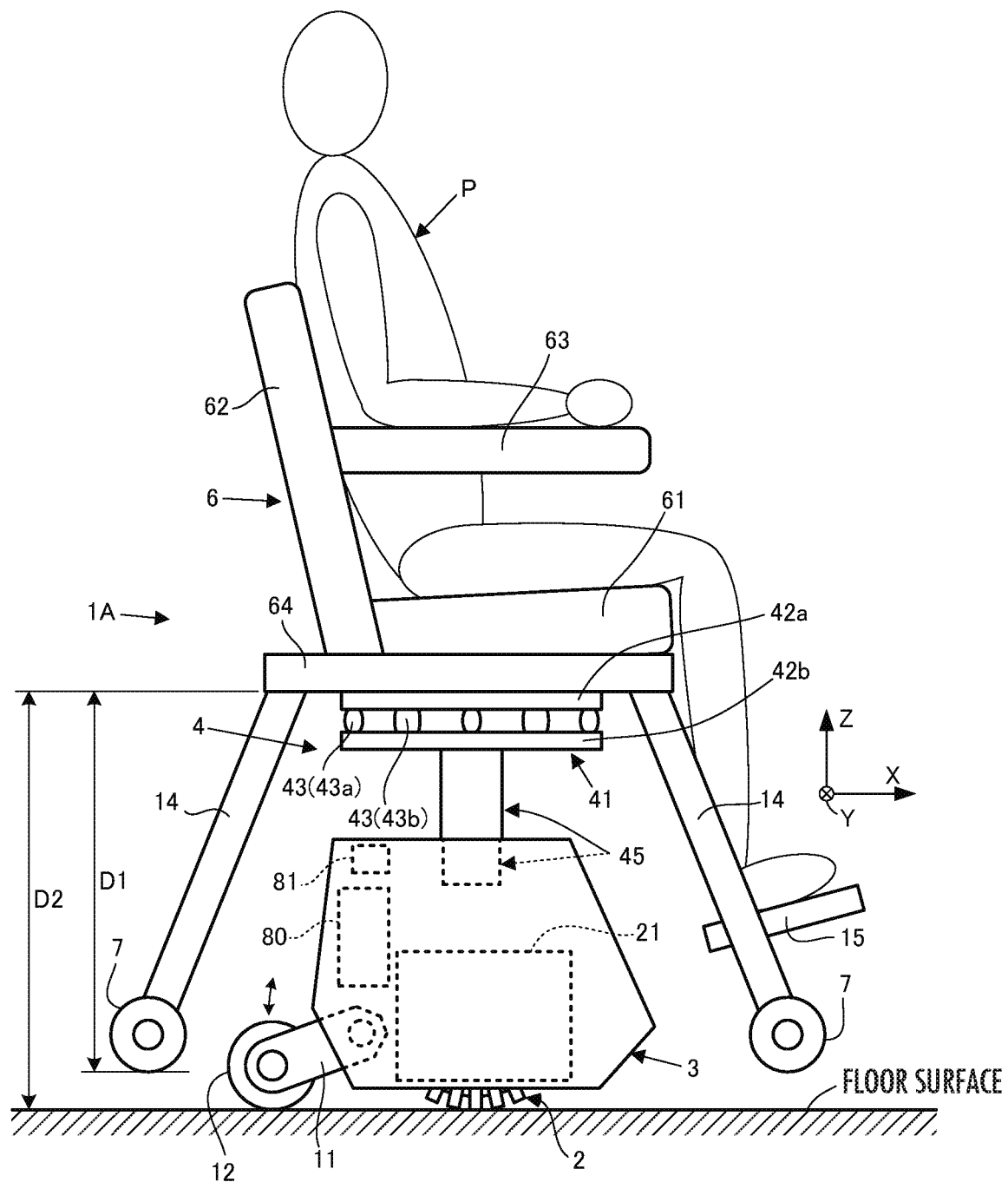
FIG. 1 is a side view illustrating a mobile body according to a first embodiment, a movement operation section thereof being in contact with the ground.
Figure 2:
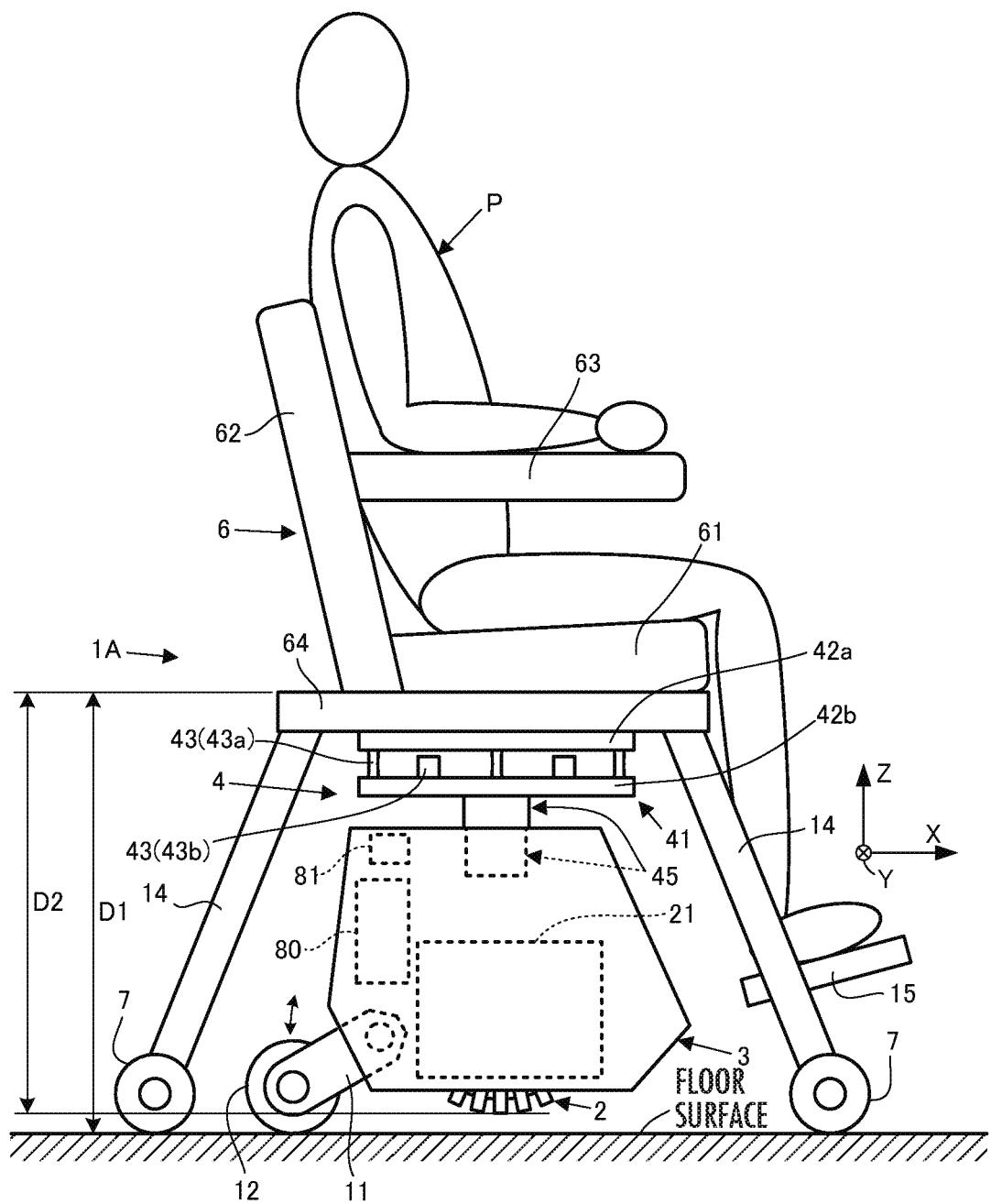
FIG. 2 is a side view illustrating the mobile body according to the first embodiment, auxiliary ground contact sections (auxiliary wheels) thereof being in contact with the ground.

A first embodiment of the present invention will be described with reference to FIG. 1 to FIG. 9. Referring to FIG. 1 and FIG. 2, a mobile body 1A according to the present embodiment is, for example, an inverted pendulum type mobile body 1A, and includes a movement operation section 2, which can move in all directions on a floor surface, a base body 3 assembled to the movement operation section 2, an occupant riding section 6, which is installed to the base body 3 through the intermediary of a connection mechanism 4, and auxiliary ground contact sections 7 connected to the occupant riding section 6.

The movement operation section 2 in the present embodiment has a publicly known structure. For example, the structure described in the foregoing Patent Literature 1 and 2 may be adopted for the movement operation section 2. In this case, the movement operation section 2 has an external shape approximately like a wheel and is driven by a drive mechanism 21 such that the movement operation section 2 can move in all directions on a floor surface.

The drive mechanism 21 includes two movement actuators 22a, 22b (illustrated in FIG. 6) composed of electric motors or the like as described in, for example, the foregoing Patent Literatures 1 and 2, and can move the movement operation section 2 in any direction on a floor surface by the motive power transmitted from the movement actuators 22a, 22b to the movement operation section 2.

However, the structures of the movement operation section 2 and the drive mechanism 21 are not limited to those described above and may be other structures.

In the following description, as illustrated in FIG. 1 and FIG. 2, the longitudinal direction of the mobile body 1A may be referred to as an X-axis direction, the lateral direction of the mobile body 1A (the direction perpendicular to the paper surface in FIG. 1 and FIG. 2) may be referred to as a Y-axis direction, and the vertical direction (or the perpendicular direction) of the mobile body 1A may be referred to as a Z-axis direction. The X-axis direction is, in other words, a direction in which the wheel-shaped movement operation section 2 standing on a floor surface moves by rolling, and the Y-axis direction is, in other words, the direction of the axle of the wheel-shaped movement operation section 2 (the direction of a rotation axis when the movement operation section 2 rolls).

The base body 3 is assembled to the movement operation section 2, covering the upper part of the movement operation section 2. Further, the drive mechanism 21 is mounted on the base body 3. In this case, the base body 3 is assembled to the movement operation section 2 such that the base body 3 can relatively rotate with respect to the movement operation section 2 around the axis of the axle of the wheel-shaped movement operation section 2. This enables the base body 3 to tilt in a pitch direction (the direction around the Y-axis in FIG. 1) with respect to a floor surface in a state in which the movement operation section 2 is in contact with the floor surface.

Further, the base body 3 is assembled to the movement operation section 2 in such a manner as to tilt together with the wheel-shaped movement operation section 2 with respect to the floor surface when the movement operation section 2 tilts with respect to the floor surface. This enables the base body 3 to tilt in the rolling direction (the direction about the X-axis in FIG. 1) with respect to the floor surface.

A tail wheel 12 is connected to the rear of the base body 3 through a link 11. The link 11 is extended to the rear from the base body 3, and the tail wheel 12 is pivotally supported rotatably about the rotation axis in the lateral direction (the Y-axis direction) at the rear end of the link 11. Further, the front end portion of the link 11 is supported swingably in the pitch direction with respect to the base body 3. Hence, the tail wheel 12 comes in contact with the ground by its own weight behind the movement operation section 2.

When the movement operation section 2 of the mobile body 1A advances, the tail wheel 12 rolls on the floor surface in a forward direction, passively following the movement operation section 2. Further, when the movement operation section 2 moves in the lateral direction (the Y-axis direction), the movement operation section 2 turns around a ground contact part of the tail wheel 12 or in the vicinity thereof, thus performing a turning operation of the mobile body 1A.

The tail wheel 12 may be urged by a spring in a direction in which the tail wheel 12 is pressed against a floor surface. Further, the tail wheel 12 may be configured to be capable of passively moving in the X-axis direction and also capable of moving in the Y-axis direction by an actuator such as an electric motor, as disclosed in, for example, Japanese Patent Application Laid-Open No. 2013-129415 or U.S. Pat. No. 8,985,249.

The occupant riding section 6 in the present embodiment is a seat-shaped riding section that has a seat 61, a back rest 62, and elbow rests 63, and a user P as an occupant can ride by sitting on the seat 61 like sitting on a chair, as illustrated in FIG. 1 and FIG. 2. The occupant riding section 6 is disposed above the base body 3. Further, a frame 64 (hereinafter referred to as the seat frame 64) fixed to the bottom of the seat 61 of the occupant riding section 6 is connected to the base body 3 through the intermediary of the connection mechanism 4 interposed between the frame 64 and the base body 3.

The connection mechanism 4 is basically configured such that the occupant riding section 6 can tilt together with the base body 3 as the base body 3 tilts. In addition, the connection mechanism 4 is configured such that the occupant riding section 6 can elastically rock with respect to the base body 3, and is configured such that the occupant riding section 6 can be relatively raised/lowered with respect to the base body 3 (i.e., the base body 3 can be relatively raised/lowered with respect to the occupant riding section 6).

Figure 3A:
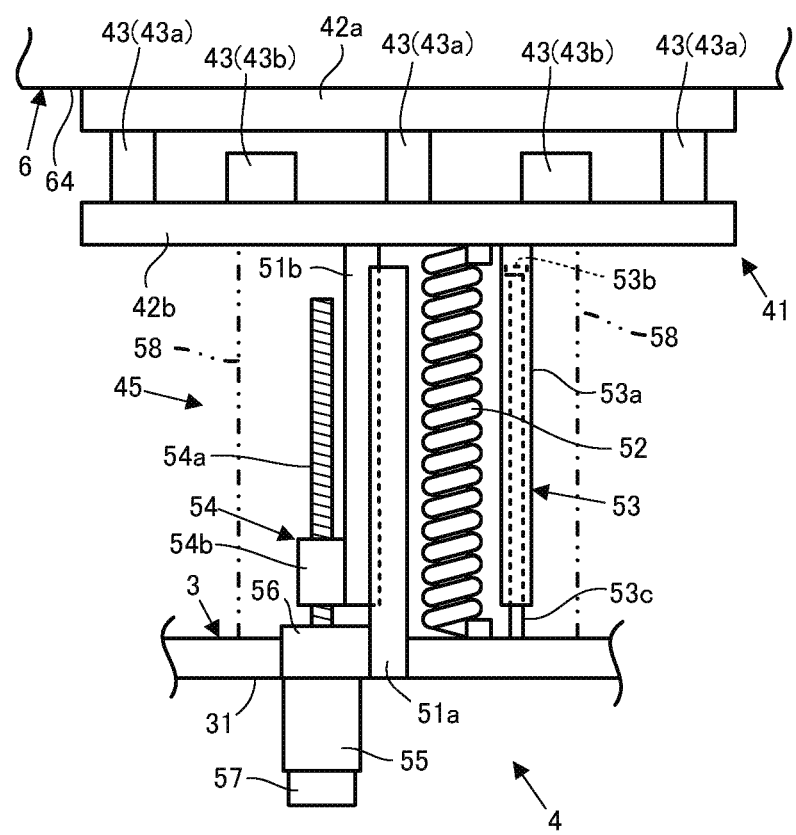
FIG. 3A and FIG. 3B are diagrams illustrating the configuration of a connection mechanism of the mobile body according to the first embodiment in operation states that are different from each other.
Figure 3B:
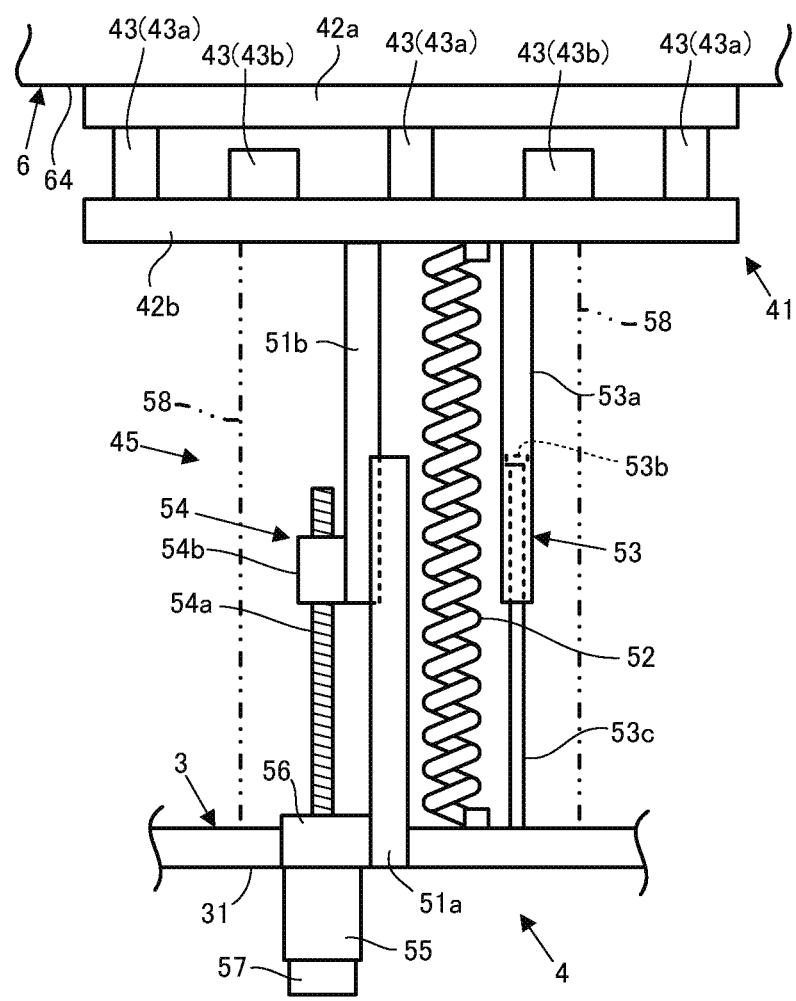

The connection mechanism 4 mentioned above will be described in detail with reference to FIG. 3A to FIG. 5D. As illustrated in FIG. 3A and FIG. 3B, the connection mechanism 4 has an elastic structure 41 for enabling the occupant riding section 6 to elastically rock with respect to the base body 3, and a lifting mechanism 45 for enabling the occupant riding section 6 to be raised/lowered with respect to the base body 3.

The elastic structure 41 corresponds to the elastic member in the present invention. The elastic structure 41 is composed of a pair of plates 42a, 42b arranged in parallel with a vertical interval provided therebetween, and a plurality of elastic members 43 interposed between the plates 42a and 42b. Further, the upper plate 42a is fixed to the seat frame 64 of the occupant riding section 6 and the lower plate 42b is connected to the base body 3 through the intermediary of the lifting mechanism 45.

As illustrated in FIG. 4, the elastic members 43 are each formed of an elastic material, such as a rubber bush, have a pillared shape (a columnar shape in the illustrated example), and have a plurality of elastic members 43a having relatively low rigidity and a plurality of elastic members 43b having rigidity that is higher than that of the elastic members 43a. These elastic members 43a and 43b are alternately arranged in a circumferential direction between the plates 42a and 42b.

The low-rigidity elastic members 43a are formed to be slimmer than the high-rigidity elastic members 43b. Further, as illustrated in FIG. 3A or FIG. 3B, both upper and lower end surfaces of the low-rigidity elastic members 43a are glued to the plates 42a and 42b, respectively, by an adhesive or the like. Further, the lower end surfaces of the high-rigidity elastic members 43b are glued to the lower plate 42b by an adhesive or the like, whereas the upper end surfaces thereof are not fixed to the upper plate 42a.

Figure 5A:
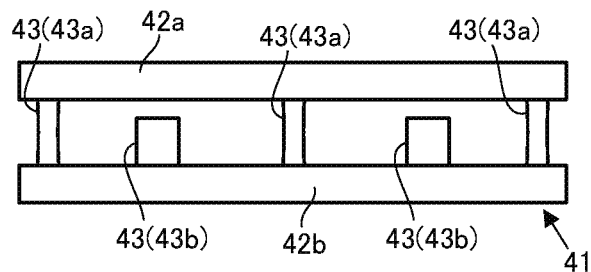
FIG. 5A to FIG. 5D are diagrams, each illustrating an operating state of the elastic structure.
Figure 5B:
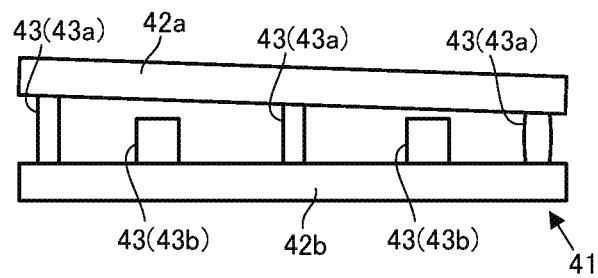

Thus, in a state in which the low-rigidity elastic members 43a are not compressed in the direction in which the plates 42a and 42b approach to each other or the compression load is sufficiently small, the high-rigidity elastic members 43b are apart from the upper plate 42a or the high-rigidity elastic members 43b are in contact with the upper plate 42a such that a contact reaction force is hardly generated between the high-rigidity elastic members 43b and the upper plate 42a, as illustrated in FIG. 5A or FIG. 5B. This state will be hereinafter referred to as a first state.

Figure 5C:
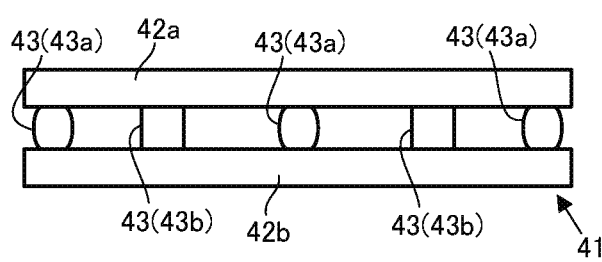
Figure 5D:
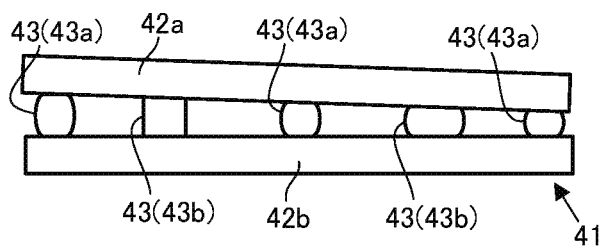

Further, if the low-rigidity elastic members 43a are compressed to a certain degree in the direction in which the plates 42a and 42b approach to each other, then the upper end surfaces of the high-rigidity elastic members 43b come in contact with the upper plate 42a such that a contact reaction force acts between the upper end surfaces of the elastic members 43b and the upper plate 42a, as illustrated in FIG. 5C or FIG. 5D. As a result, in the elastic structure 41, the high-rigidity elastic members 43b in addition to the low-rigidity elastic members 43a are compressed between the plates 42a and 42b. This state will be hereinafter referred to as a second state.

Thus, the elastic structure 41 can be placed in the two types of states, namely, the first state and the second state described above, according to a load between the plates 42a and 42b. In this case, in the first state, the elastic deformation of the low-rigidity elastic members 43a enables the upper plate 42a to elastically rock together with the occupant riding section 6 with respect to the lower plate 42b, as illustrated in FIG. 5B. In the first state, the high-rigidity elastic members 43b do not generate or hardly generate an elastic force, so that the rigidity of the elastic structure 41 (the rigidity between the plates 42a and 42b) will be relatively low.

Further, in the second state, the elastic deformation of both the low-rigidity elastic members 43a and the high-rigidity elastic members 43b enables the upper plate 42a to elastically rock together with the occupant riding section 6 with respect to the lower plate 42b, as illustrated in FIG. 5D. In the second state, both the low-rigidity elastic members 43a and the high-rigidity elastic members 43b generate an elastic force, so that the rigidity of the elastic structure 41 (the rigidity between the plates 42a and 42b) will be higher than the rigidity in the first state.

As illustrated in FIG. 3A and FIG. 3B, the lifting mechanism 45 includes a first guide member 51a, which is extended upward from a frame 31 (hereinafter referred to as the base body frame 31) at the upper end portion of the base body 3, a second guide member 51b which is extended downward from the lower plate 42b of the elastic structure 41 and which is engaged with the first guide member 51a slidably in the vertical direction, a coil spring 52 and a damper 53 extendably interposed in the vertical direction between the lower plate 42b of the elastic structure 41 and the base body frame 31, and a lifting actuator 55 that outputs a driving force, which is used for relatively raising/lowering the occupant riding section 6 with respect to the base body 3, through the intermediary of, for example, a ball screw mechanism 54 having a screw portion 54a and a nut portion 54b.

The lifting actuator 55 is composed of, for example, an electric motor installed to the base body frame 31, and the rotating shaft thereof (not illustrated) is connected to the screw portion 54a of the ball screw mechanism 54 through the intermediary of a reduction gear 56. The screw portion 54a vertically extends on the side of the first guide member 51a. Further, the nut portion 54b fitted to the screw portion 54a is fixed to the second guide member 51b.

Consequently, as the screw portion 54a of the ball screw mechanism 54 is rotatively driven by the lifting actuator 55, the nut portion 54b and the second guide member 51b are relatively raised/lowered with respect to the base body 3, thus causing the elastic structure 41 and the occupant riding section 6 to be relatively raised/lowered with respect to the base body 3.

The transmission of motive power from the lifting actuator 55 to the second guide member 51b can be performed also by a rotation-linear motion conversion mechanism other than the ball screw mechanism 54. Further, the lifting actuator 55 may be composed of a linear motion actuator, and the second guide member 51b can be directly moved up/down with respect to the first guide member 51a by the linear motion actuator.

The lifting actuator 55 is provided with an electric brake device 57 capable of non-rotatably locking the rotating shaft of the lifting actuator 55 by a frictional force or groove-ridge fitting or the like. The brake device 57 corresponds to the locking mechanism in the present invention, and is configured to be placed in a state of locking the rotating shaft of the lifting actuator 55 (i.e., a state in which the relative raising/lowering of the occupant riding section 6 with respect to the base body 3 is locked. This state will be hereinafter referred to as the locked state) when power is supplied. Further, the brake device 57 is configured to clear the locked state when the power supply is cut off.

The coil spring 52 has a function as the first spring member and the second spring member in the present invention. The coil spring 52 has one end portion (the upper end portion) thereof connected to the lower plate 42b of the elastic structure 41 and the other end portion (the lower end portion) thereof connected to the base body frame 31 in a state in which the axis of the coil spring 52 is oriented in the vertical direction. The coil spring 52 extends as the occupant riding section 6 and the elastic structure 41 are relatively raised with respect to the base body 3, thereby generating an elastic force (tensile elastic force) that urges the occupant riding section 6 in a direction for approaching to the base body 3 by the extension.

The damper 53 has a cylindrical portion 53a filled with a fluid, such as hydraulic oil, a piston 53b, which is slidable in the cylindrical portion 53a, and a rod 53c which extendably projects from the piston 53b to one end of the cylindrical portion 53a. Further, in a state in which the axis of the damper 53 is oriented in the vertical direction, an end of the cylindrical portion 53a (the end on the opposite side from the rod 53c) is fixed to the lower plate 42b of the elastic structure 41, and the distal end of the rod 53c is fixed to the base body frame 31.

Thus, when the occupant riding section 6 and the elastic structure 41 are raised with respect to the base body 3 (when the occupant riding section 6 leaves the base body 3), the rod 53c exposed from the cylindrical portion 53a extends. Further, when the occupant riding section 6 and the elastic structure 41 are lowered with respect to the base body 3 (when the occupant riding section 6 approaches to the base body 3), the rod 53c exposed from the cylindrical portion 53a retracts.

Then, the damper 53 is configured to generate viscous resistance by a fluid in the cylindrical portion 53a circulating through an orifice (not illustrated) as the rod 53c extends or retracts (as the piston 53b slides in the cylindrical portion 53a). In this case, the damper 53 is configured such that the viscous resistance obtained when the rod 53c retracts (when the occupant riding section 6 is lowered with respect to the base body 3) is higher than the viscous resistance obtained when the rod 53c extends (when the occupant riding section 6 is raised with respect to the base body 3).

The vertical relationship between the cylindrical portion 53a of the damper 53 and the rod 53c thereof exposed therefrom may be reversed from the above, and the end of the cylindrical portion 53a may be fixed to the base body frame 31 and the distal end of the rod 53c may be fixed to the lower plate 42b of the elastic structure 41.

In the present embodiment, the elastic structure 41 and the lifting mechanism 45 constituting the connection mechanism 4 are configured as described above. The connection mechanism 4 further includes a cylindrical cover 58 that covers the periphery of a mechanism (specifically, the first guide member 51a, the second guide member 51b, the coil spring 52, the damper 53, and the ball screw mechanism 54) existing in the space between the lower plate 42b of the elastic structure 41 and the base body frame 31, as indicated by the two-dot chain lines in FIG. 3A and FIG. 3B. The cover 58 has both end portions thereof fixed to the lower plate 42b and the base body frame 31 and is configured to extend or retract as the occupant riding section 6 is raised/lowered with respect to the base body 3.

The cover 58 may be interposed between the seat frame 64 of the occupant riding section 6 and the base body 3 so as to cover the periphery of, for example, the elastic structure 41 in addition to the mechanism existing in the space between the lower plate 42b of the elastic structure 41 and the base body frame 31.

Supplementally, the lifting mechanism 45 is disposed below the elastic structure 41 in the connection mechanism 4 of the present embodiment; alternatively, however, the lifting mechanism 45 may be disposed above the elastic structure 41, the upper plate 42a of the elastic structure 41 may be connected to the seat frame 64 of the occupant riding section 6 through the intermediary of the lifting mechanism 45, and the lower plate 42b of the elastic structure 41 may be fixed to the base body frame 31.

Referring to FIG. 1 and FIG. 2, the auxiliary ground contact section 7 in the present embodiment is a wheel attached to the bottom end portion of each of a plurality of legs 14 which are extended downward from the peripheral edge of the seat frame 64 of the occupant riding section 6 and which are arranged around the base body 3. Hereinafter, each of the auxiliary ground contact sections 7 will be referred to as the auxiliary wheel 7.

In the present embodiment, the mobile body 1A is provided with four pairs of the legs 14 and the auxiliary wheels 7, and these four pairs of the legs 14 and the auxiliary wheels 7 are disposed one pair each on the left and right at the front side and the rear side of the occupant riding section 6. FIG. 1 and FIG. 2 illustrate only the pairs (the two pairs at the front and the rear) of the legs 14 and the auxiliary wheels 7 on the right side of the mobile body 1A, and the pairs (the two pairs at the front and the rear) of the legs 14 and the auxiliary wheels 7 on the left side are positioned behind the pair of the legs 14 and the auxiliary wheels 7 on the right side.

When the auxiliary wheels 7 are in contact with a floor surface, the auxiliary wheels 7 are pivotably supported by the lower end portions of the legs 14 such that the auxiliary wheels 7 can roll on the floor surface and also turn in a yaw direction (a direction about the Z-axis). For example, so-called universal casters can be adopted as the auxiliary wheels 7. Further, the auxiliary wheels 7 are attached to the legs 14 such that braking (braking in a direction for attenuating the rolling speed of the auxiliary wheels 7) by a frictional force or the like is applied when the auxiliary wheels 7 roll. The auxiliary wheels 7 are configured such that, for example, a braking force that acts remains constant. Alternatively, the auxiliary wheels 7 may be configured such that the braking force that acts changes according to a ground contact load. Alternatively, the auxiliary wheels 7 may be configured such that the braking force can be changed to stop the auxiliary wheels 7 at a proper distance while securing the stability of the attitude of the mobile body 1A in response to an external command.

Further, a foot rest 15 on which the user P on the seat 61 of the occupant riding section 6 places his or her both feet is attached to the left and right legs 14 on the front side of the mobile body 1A. The foot rest 15 may be configured to be separated to a foot rest for the left foot and a foot rest for the right foot, or configured in one piece.

A description will now be given of the relationship between the distance in the vertical direction from the seat frame 64 of the occupant riding section 6 to the lower end portions of the auxiliary wheels 7 and the relative raising/lowering amount (the amount of relative displacement in the vertical direction) with respect to the base body 3. In the following description, as illustrated in FIG. 1 and FIG. 2, the distance in the vertical direction from the seat frame 64 to the lower end portion of each of the auxiliary wheels 7 will be denoted by D1, and the distance in the vertical direction from the seat frame 64 to the lower end portion of the movement operation section 2 (more specifically, the distance in a state in which the plates 42a and 42b of the elastic structure 41 are parallel to each other) will be denoted by D2. In this case, the distance D1 takes a substantially constant value, whereas the distance D2 changes according to the relative raising/lowering of the occupant riding section 6 with respect to the base body 3.

In the present embodiment, the variable range of the relative raising/lowering amount of the occupant riding section 6 with respect to the base body 3 is set such that the occupant riding section 6 can be relatively raised/lowered with respect to the base body 3 between a state in which the occupant riding section 6 is relatively raised with respect to the base body 3 such that the distance D1 is smaller than the distance D2 (hereinafter referred to as "the D1<D2 state") as illustrated in FIG. 1 and a state in which the occupant riding section 6 is relatively lowered with respect to the base body 3 such that the distance D1 is larger than the distance D2 (hereinafter referred to as "the D1>D2 state") as illustrated in FIG. 2.

The D1<D2 state is a state in which the movement operation section 2 can be brought into contact with a floor surface while the auxiliary wheels 7 are held above the floor surface, as illustrated in FIG. 1. In this state, the mobile body 1A can move by driving the movement operation section 2.

Further, in the D1<D2 state, the occupant riding section 6 and each pair of the leg 14 and the auxiliary wheel 7 can tilt with respect to the floor surface as the base body 3 tilts with respect to the floor surface. Further, when the amount of tilting in the pitch direction of the occupant riding section 6 with respect to the floor surface increases to a predetermined amount in the forward tilt direction or the rearward tilt direction, the auxiliary wheels 7 on the front side or the auxiliary wheels 7 on the rear side among the four auxiliary wheels 7 come in contact with the floor surface, thus preventing the occupant riding section 6 from tilting further.

Further, when the amount of tilting in the rolling direction of the occupant riding section 6 with respect to the floor surface increases to a predetermined amount in the rightward tilt direction or the leftward tilt direction, the auxiliary wheels 7 on the right side or the auxiliary wheels 7 on the left side among the four auxiliary wheels 7 come in contact with the floor surface, thus preventing the occupant riding section 6 from tilting further.

Thus, in the D1<D2 state, excessive tilting of the occupant riding section 6 is limited by the auxiliary wheels 7.

Meanwhile, the D1>D2 state is a state in which the auxiliary wheels 7 can be brought into contact with the floor surface while the movement operation section 2 is held above the floor surface, as illustrated in FIG. 2. In this state, the attitude of the occupant riding section 6 with respect to the floor surface is maintained to be substantially constant (e.g., an attitude at which the seat frame 64 is substantially parallel to the floor surface) by the plurality of front, rear, left and right auxiliary wheels 7 of the occupant riding section 6 coming in contact with the floor surface. Further, in this state, the mobile body 1A cannot be moved even if the movement operation section 2 is driven.

Further, a supplemental description related to the elastic force generated by the coil spring 52 of the lifting mechanism 45 will be given. For example, if the power supply of the lifting actuator 55 of the lifting mechanism 45 and the brake device 57 is cut off in the D1<D2 state illustrated in FIG. 1, then the occupant riding section 6 and each pair of the leg 14 and the auxiliary wheel 7 come down toward the floor surface due to the gravity acting thereon, causing the auxiliary wheels 7 at the front, rear, left and right of the occupant riding section 6 to come in contact with the floor surface. This contact with the floor surface leads to a state in which D1=D2 (a state in which the movement operation section 2 and the auxiliary wheels 7 at the front, rear, left and right of the occupant riding section 6 are in contact with the floor surface).

In the D1=D2 state, the elastic force generated by the coil spring 52 is set such that the ground contact load of the movement operation section 2 (a floor reaction force acting on the movement operation section 2) can be reduced to be sufficiently smaller than the overall ground contact load of the auxiliary wheels 7 in contact with the ground (a floor reaction force acting on the entire auxiliary wheels 7 in contact with the ground), or the ground contact load of the movement operation section 2 can be reduced to zero.

For example, the elastic force generated by the coil spring 52 (an urging force in the direction in which the base body 3 is raised with respect to the occupant riding section 6) in the D1=D2 state is set to be an elastic force of a magnitude close to that of the gravity acting on the mechanism (the lifting mechanism 45, the base body 3, the movement operation section 2 and the like) under the elastic structure 41, or an elastic force that is larger than the gravity.

Thus, in the D1=D2 state, the majority or all of the gravity acting on the entire mobile body 1A is supported by the auxiliary wheels 7 that are in contact with the ground. The elastic force generated by the coil spring 52 in the D1=D2 state can be set to be an elastic force that enables the movement operation section 2 to move up from a floor surface.

Figure 6:
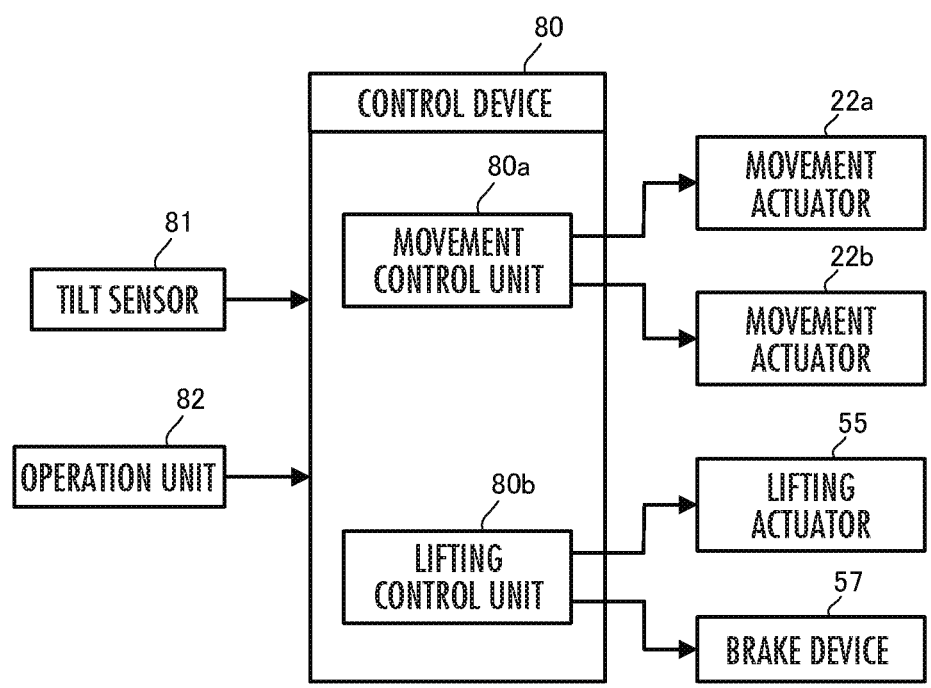
FIG. 6 is a block diagram illustrating a configuration related to the control of the mobile body according to the first embodiment.

A description will now be given of the configuration for controlling the operation of the mobile body 1A. Referring to FIG. 6, the mobile body 1A includes a control device 80 which has a function for controlling the operations of the two movement actuators 22a, 22b, which drive the movement operation section 2, and controlling the operations of the lifting actuator 55 and the brake device 57 of the lifting mechanism 45, and a tilt sensor 81 for detecting the tilt angle (the tilt angle with respect to the vertical direction) of the base body 3.

The tilt sensor 81 includes, for example, an acceleration sensor and an angular velocity sensor, which are capable of detecting the accelerations and the angular velocities in the direction of the three axes, and is mounted in the base body 3 (refer to FIG. 1 or FIG. 2). In this case, the tilt sensor 81 carries out processing such as, for example, strapdown arithmetic processing or the like by a processor or the like (not illustrated) provided in the tilt sensor 81, thereby sequentially measuring (estimating) the tilt angle of the base body 3 in the rolling direction (the direction about the X-axis) and the tilt angle of the base body 3 in the pitch direction (the direction about the Y-axis) from the detection values of the acceleration and the angular velocity, and then outputting detection signals that indicate the measurement values to the control device 80.

Further, the tilt sensor 81 also has a function for measuring (estimating) the angular velocity of the base body 3 in the yaw direction (the direction about the Z-axis) in addition to measuring the tilt angle of the base body 3, and outputs also detection signals indicating the measurement values to the control device 80.

The arithmetic processing for measuring the tilt angle and the angular velocity in the yaw direction of the base body 3 from the detection values of the acceleration and the angular velocity obtained by the acceleration sensor and the angular velocity sensor included in the tilt sensor 81 may be performed by the control device 80.

The control device 80 is composed of one or more electronic circuit units, which include, for example, microcomputers, memories, interface circuits and the like. The control device 80 receives the detection signals from the tilt sensor 81, and also receives command information related to the operation of the mobile body 1A from an operation unit 82 provided on the elbow rest 63 or the like of the occupant riding section 6 of the mobile body 1A or carried by the user P. The operation unit 82 carried by the user P may be a communication terminal, such as, for example, a smartphone or a tablet terminal possessed by the user P. Further, the mobile body 1A may have a part on which a communication terminal possessed by the user P can be detachably mounted.

The control device 80 includes a movement control unit 80a, which controls the movement of the movement operation section 2 through the two movement actuators 22a, 22b, and a lifting control unit 80b, which controls the operation of the lifting mechanism 45 through the lifting actuator 55 and the brake device 57, as the function implemented by one or both of an installed hardware configuration and a program (software configuration). The control device 80 has a function as the stabilization control device in the present invention due to the function of the movement control unit 80a.

The movement control of the movement operation section 2 by the movement control unit 80a is performed, for example, as described below. The movement control unit 80a controls the movement of the movement operation section 2 such that the attitude of the mobile body 1A is stabilized in the D1<D2 state (the state illustrated in FIG. 1). More specifically, in the present embodiment, the movement control unit 80a performs the control of the movement of the movement operation section 2 such that the overall center of gravity of the mobile body 1A including the user P on the occupant riding section 6 (the user P seated on the seat 61) or any object mounted on the mobile body 1A is balanced in the same manner as the mass point of an inverted pendulum.

In this case, more specifically, the state in which the overall center of gravity is balanced means a dynamically balanced state in which the resultant force of the gravity acting on the overall center of gravity and the inertial force generated by a specified acceleration (a target acceleration determined by the control device 80) of the overall center of gravity causes a moment (a moment in the direction about the horizontal axis) acting on the central point of the floor reaction force of the ground contact portion of the movement operation section 2 to become zero or substantially zero. Such a balanced state is a state in which, for example, the overall center of gravity is positioned directly above or substantially directly above the central point of the floor reaction force of the movement operation section 2 in contact with the floor surface (i.e., a state in which the overall center of gravity is positioned substantially directly above the ground contact portion of the movement operation section 2) in a steady state in which the mobile body 1A moves straight forward at a constant speed.

The specific control processing by the movement control unit 80a is carried out, for example, as described below. The movement control unit 80a determines a target value DVw_cmd_x of the translational acceleration in the X-axis direction of the movement operation section 2 and a target value DVw_cmd_y of the translational acceleration in the Y-axis direction thereof according to, for example, expressions (1a) and (1b) given below at a predetermined control processing cycle. Then, the movement control unit 80a controls the movement actuators 22a and 22b thereby to control the movement of the movement operation section 2 so as to attain a translational movement speed (a target value) obtained by integrating the above target values.

$$DVw\_cmd\_x = Kvb\_x \cdot (Vb\_cmd\_x - Vb\_act\_x) + Kth\_y \cdot (\theta b\_cmd\_y - \theta b\_act\_y) - Kw\_y \cdot \omega b\_act\_y \quad (1a)$$

$$DVw\_cmd\_y = Kvb\_y \cdot (Vb\_cmd\_y - Vb\_act\_y) - Kth\_x \cdot (\theta b\_cmd\_x - \theta b\_act\_x) + Kw\_x \cdot \omega b\_act\_x \quad (1b)$$

where Vb_cmd_x in the right side of expression (1a) denotes a target value of the translational movement speed in the X-axis direction of the overall center of gravity of the mobile body 1A; Vb_act_x denotes an actual translational movement speed in the X-axis direction of the overall center of gravity of the mobile body 1A; θb_cmd_y denotes a target value of the tilt angle in the direction about the Y-axis (the pitch direction) of the base body 3; θb_act_y denotes an actual tilt angle in the direction about the Y-axis (the pitch direction) of the base body 3; ωb_act_y denotes a temporal change rate of the actual tilt angle (the tilt angular velocity) in the direction about the Y-axis (the pitch direction) of the base body 3; and Kvb_x, Kth_y, and Kw_y denote gains (feedback gains) of predetermined values.

Further, Vb_cmd_y on the right side of expression (1b) denotes a target value of the translational movement speed in the Y-axis direction of the overall center of gravity of the mobile body 1A; Vb_act_y denotes an actual translational movement speed in the Y-axis direction of the overall center of gravity of the mobile body 1A; θb_cmd_x denotes a target value of the tilt angle in the direction about the X-axis (the rolling direction) of the base body 3; θb_act_x denotes an actual tilt angle in the direction about the X-axis (the rolling direction) of the base body 3; ωb_act_x denotes a temporal change rate of the actual tilt angle (the tilt angular velocity) in the direction about the X-axis (the rolling direction) of the base body 3; and Kvb_y, Kth_x, and Kw_x denote gains (feedback gains) of predetermined values.

In this case, the measurement values indicated by the outputs of the tilt sensor 81 can be used as the values of the actual tilt angles θb_act_x, θb_act_y and the temporal change rates (the tilt angular velocities) thereof ωb_actx, ωb_act_y.

Further, as the values of the actual translational movement speeds Vb_act_x. Vb_act_y of the overall center of gravity, the estimated values calculated according to, for example, expressions (2a) and (2b) given below, can be used.

$$Vb\_act\_x = Vw\_act\_x + h \cdot \omega b\_act\_y \quad (2a)$$

$$Vb\_act\_y = Vw\_act\_y - h \cdot \omega b\_act\_x \quad (2b)$$

In expressions (2a) and (2b), Vw_act_x denotes an actual translational movement speed in the X-axis direction of the movement operation section 2, Vw_act_y denotes an actual translational movement speed in the Y-axis direction of the movement operation section 2, and h denotes a height (set value) of the overall center of gravity. As the values of Vw_act_x and Vw_act_y, measurement values by an appropriate sensor or estimated values obtained by estimation from the detection values of the rotational speeds of the movement actuators 22a and 22b can be used. Alternatively, as the pseudo estimated values of Vw_act_x and Vw_act_y, the target values (the integrated value of each of DVw_cmd_x and DVw_cmd_y) of the translational speeds determined in a preceding control processing cycle of the movement control unit 80a can be used.

The positive directions of Vb_act_x and Vw_act_x are the forward direction of the mobile body 1A, the positive directions of Vb_act_y and Vw_act_y are the leftward direction of the mobile body 1A, the positive direction of ωb_act_y is the clockwise direction when the mobile body 1A is viewed from the right side, and the positive direction of ωb_act_x is the clockwise direction when the mobile body 1A is viewed from the back side.

Further, for example, the values determined on the basis of the estimated values of the movement amounts of the center of gravity of the user P (the amount of relative movement with respect to the occupant riding section 6), or the command values set on the basis of an operation through the operation unit 82 by the user P. or the values obtained by combining these values can be used as the target values Vb_cmd_x and Vb_cmd_y of the translational movement speed of the overall center of gravity in expressions (1a) and (1b) given above. As the method for estimating the movement amount of the center of gravity of the user P, the method described in, for example, Japanese Patent Application Laid-Open No. 2013-129415 or U.S. Pat. No. 8,985, 249 can be used.

Further, as the target values ωb_cmd_x and θb_cmd_y of a tilt angle of the base body 3, the values of a tilt angle that makes it possible to secure a balanced state of the overall center of gravity in a steady state, in which the translational movement speeds Vb_act_x and Vb_act_y of the overall center of gravity are settled to target values, can be used. For example, the target values θb_cmd_x and θb_cmd_y of a tilt angle are set such that the overall center of gravity is positioned directly above or substantially directly above of the central point of the floor reaction force of the movement operation section 2 (i.e., substantially directly above the ground contact portion of the movement operation section 2) in a state in which the tilt angle of the base body 3 coincides with the target values θb_cmd_x and θb_cmd_y.

The target values θb_cmd_x and θb_cmd_y of a tilt angle can be temporarily (transiently) set to values shifted from the values of a tilt angle that can secure the balanced state of the overall center of gravity.

In the present embodiment, the movement of the movement operation section 2 is controlled by the movement control unit 80a as described above. In the case where the movement of the tail wheel 12 in the lateral direction (the movement in the Y-axis direction) can be controlled by an actuator, such as an electric motor, a method described in, for example, Japanese Patent Application Laid-Open No. 2013-129415 or U.S. Pat. No. 8,985,249 can be used as the method for controlling the movement of the tail wheel 12 in the lateral direction.

When the user P gets on or off the occupant riding section 6, the lifting control unit 80b basically operates the lifting actuator 55 and the brake device 57 such that the mobile body 1A is set to the D1>D2 state illustrated in FIG. 2. Further, when the mobile body 1A moves by driving the movement operation section 2, the lifting control unit 80b operates the lifting actuator 55 and the brake device 57 such that the mobile body 1A is set to the D1<D2 state illustrated in FIG. 1. Further, if an abnormality, such as an operation failure of the movement operation section 2, occurs while the mobile body 1A is moving, then the lifting actuator 55 and the brake device 57 are operated to bring the auxiliary wheels 7 into contact with the ground by relatively lowering the occupant riding section 6 with respect to the base body 3.

The operation of the mobile body 1A will now be described in more detail. In a state in which the power of the mobile body 1A is not turned on, the plurality of auxiliary wheels 7 at the front, rear, left and right of the occupant riding section 6 are in contact with the floor surface. In this state, when a power switch, which is not illustrated, of the mobile body 1A is turned on (when the power of the mobile body 1A is turned on), the control device 80 is started, placing the mobile body 1A in a standby state (waiting state).

In this standby state, the lifting control unit 80b of the control device 80 operates the lifting actuator 55 to set the mobile body 1A to the D1>D2 state illustrated in FIG. 2. This causes the base body 3 to be relatively raised with respect to the occupant riding section 6, and the movement operation section 2 moves upward off the floor surface.

Then, when the base body 3 moves up to a predetermined height position with respect to the occupant riding section 6, the lifting control unit 80b operates the brake device 57 to a locked state. This locks the relative raising/lowering of the base body 3 with respect to the occupant riding section 6

(consequently retaining the D1>D2 state). Then, after operating the brake device 57 to the locked state, the lifting control unit 80*b* cuts off the supply of power to the lifting actuator 55.

In the standby state, the low-rigidity elastic members 43*a* of the elastic structure 41 are not compressed, so that the high-rigidity elastic members 43*b* are apart from the upper plate 42*a*, as illustrated in FIG. 2.

The user P gets on the occupant riding section 6 by sitting on the seat 61 before the power of the mobile body 1A is turned on or after the mobile body 1A is set to the standby state by turning on the power of the mobile body 1A.

Then, the user P performs, in the standby state, a predetermined operation through the operation unit 82 in order to start driving the mobile body 1A. Thus, a drive start command is output from the operation unit 82 to the control device 80.

At this time, the lifting control unit 80*b* of the control device 80 cuts off the supply of power to the brake device 57, thereby clearing the locked state of the brake device 57. Thus, the relative locking of the relative raising/lowering of the occupant riding section 6 with respect to the base body 3 is cleared.

Further, the lifting control unit 80*b* operates the lifting actuator 55 to change the state of the mobile body 1A from the D1>D2 state illustrated in FIG. 2 to the D1<D2 state illustrated in FIG. 1. This causes the occupant riding section 6 to be relatively raised by a predetermined amount with respect to the base body 3 (i.e., to cause the base body 3 to be relatively lowered by a predetermined amount with respect to the occupant riding section 6), thus changing the state of the mobile body 1A from the D1>D2 state to the D1<D2 state. More specifically, from the D1>D2 state, the movement operation section 2 comes down to be in contact with the floor surface and the auxiliary wheels 7 move upward off the floor surface, thus switching the state of the mobile body 1A to the D1<D2 state. This enables the occupant riding section 6 to tilt with respect to the floor surface.

Then, when the rise of the occupant riding section 6 by the predetermined amount with respect to the base body 3 is completed, the lifting control unit 80*b* operates the brake device 57 to the locked state so as to lock the relative raising/lowering of the occupant riding section 6 with respect to the base body 3. Then, after operating the brake device 57 to the locked state, the lifting control unit 80*b* cuts off the supply of power to the lifting actuator 55.

In the process of the mobile body 1A shifting from the D1>D2 state to the D1<D2 state as described above, after the movement operation section 2 comes in contact with the floor surface, the ground contact load of the movement operation section 2 increases, whereas the overall ground contact load on the auxiliary wheels 7 decreases. This causes the low-rigidity elastic members 43*a* of the elastic structure 41 to be compressed, and the high-rigidity elastic members 43*b* to come in contact with the upper plate 42*a* so as to be compressed. Consequently, the rigidity of the elastic structure 41 becomes relatively low immediately after the movement operation section 2 starts to come in contact with the ground (immediately before the auxiliary wheels 7 start to move up), but thereafter, the rigidity of the elastic structure 41 increases as the ground contact load on the movement operation section 2 increases (as the overall ground contact load on the auxiliary wheels 7 decreases).

Then, when the state shifts to the state in which the entire auxiliary wheels 7 move up from the floor surface (the D1<D2 state), the overall weight of the user P and the occupant riding section 6 acts on the elastic structure 41, so that both the low-rigidity elastic members 43*a* and the high-rigidity elastic members 43*b* of the elastic structure 41 are compressed between the plates 42*a* and 42*b*.

Therefore, in the state in which the auxiliary wheels 7 are in contact with the floor surface such that the ground contact load acts thereon, the rigidity of the elastic structure 41 will be lower than that in the state in which the entire auxiliary wheels 7 are held above the floor surface (i.e., the state in which the entire auxiliary wheels 7 are not in contact with the ground).

In the operation of shifting the D1>D2 state to the D1<D2 state (hereinafter may be referred to as "the raising operation of the occupant riding section 6), the height of the occupant riding section 6 from the floor surface or the height of the auxiliary wheels 7 from the floor surface in the D1<D2 state can be made adjustable by making the amount of relative raising operation (the raising operation in the foregoing predetermined amount) of the occupant riding section 6 with respect to the base body 3 variably adjustable within a predetermined range by, for example, the operation through the operation unit 82.

In the middle of the raising operation of the occupant riding section 6, if the state in which D1=D2 (the state in which both the movement operation section 2 and the auxiliary wheels 7 are in contact with the floor surface) or a state near this state or if a load sensor or the like, which is not illustrated, detects that the movement operation section 2 has come in contact with the floor surface, then the movement control unit 80*a* of the control device 80 starts the movement control of the movement operation section 2 described above.

However, in this case, until the raising operation of the occupant riding section 6 is completed, the movement control unit 80*a* controls the operations of the movement actuators 22*a*, 22*b* such that the braking force is applied from the movement actuators 22*a*, 22*b* to the movement operation section 2. For example, the movement control unit 80*a* causes the braking force to be applied to the movement operation section 2 by controlling the operations of the movement actuators 22*a*, 22*b* by steadily setting the target values Vb_cmd_x and Vb_cmd_y of the translational movement speeds in the foregoing expressions (1a) and (1b) to zero.

Then, when the raising operation of the occupant riding section 6 is completed, the movement control unit 80*a* thereafter controls the movement of the movement operation section 2 through the movement actuators 22*a*, 22*b* such that the overall center of gravity of the mobile body 1A is maintained in the balanced state. In this case, if, for example, the user P tilts his or her upper body forward (consequently shifting the overall center of gravity forward), then the movement of the movement operation section 2 is controlled such that the mobile body 1A moves forward.

Further, if, for example, the user P tilts his or her upper body to the right side or the left side (consequently shifting the overall center of gravity to the right side or the left side), then the movement operation section 2 is controlled so as to move rightward or leftward, thus turning the mobile body 1A to the right side or the left side.

Further, in the present embodiment, if the occurrence of an abnormality, such as an operation failure of the movement operation section 2, is detected while the mobile body 1A is performing the foregoing operation (during an operation after the standby state) or if the user P performs an operation for forcibly stopping the drive of the mobile body 1A through the operation unit 82, then the control device 80 cuts off the supply of power to the movement actuators 22a, 22b, the lifting actuator 55, and the brake device 57 to stop the operations thereof.

At this time, the locking of the relative raising/lowering of the occupant riding section 6 with respect to the base body 3 is released, causing the occupant riding section 6 to move down due to the gravity acting on the occupant riding section 6 and the user P or the like, and consequently causing the plurality of auxiliary wheels 7 at the front, rear, left and right of the occupant riding section 6 to land on the floor surface. Consequently, the occupant riding section 6 is retained in a state in which the attitude thereof with respect to the floor surface is maintained to be constant.

Further, in this case, the viscous resistance generated by the damper 53 prevents the occupant riding section 6 from being rapidly lowered. This makes it possible to ease the impact when the auxiliary wheels 7 land.

In addition, after the auxiliary wheels 7 land, the urging force of the coil spring 52 of the lifting mechanism 45 makes the floor reaction force acting on the movement operation section 2 sufficiently small or zero. Therefore, even if the movement operation section 2 is driven by the movement actuators 22a, 22b, the mobile body 1A is prevented from moving by the drive of the movement operation section 2.

Further, the mobile body 1A of the present embodiment configured as described above can provide the following effects when moving by the drive of the movement operation section 2.

It will be assumed that, for example, the user P on the occupant riding section 6 (the user P seated in the seat 61) attempts to move the mobile body 1A forward at a desired moving speed by shifting his or her own weight. In this case, the user P tilts his or her upper body forward thereby to move forward the overall center of gravity of the mobile body 1A including the user P as illustrated in, for example, FIG. 7 or FIG. 8.

The user P tilts his or her upper body further forward as the desired moving speed (hereinafter referred to as the required speed) of the mobile body 1A increases. For example, the situation illustrated in FIG. 8 is a situation in which the required speed of the mobile body 1A (the required speed in the advancing direction) is higher than that in the situation illustrated in FIG. 7. For this reason, the user P in FIG. 8 is tilting his or her upper body further forward than the user P in FIG. 7.

Figure 7:
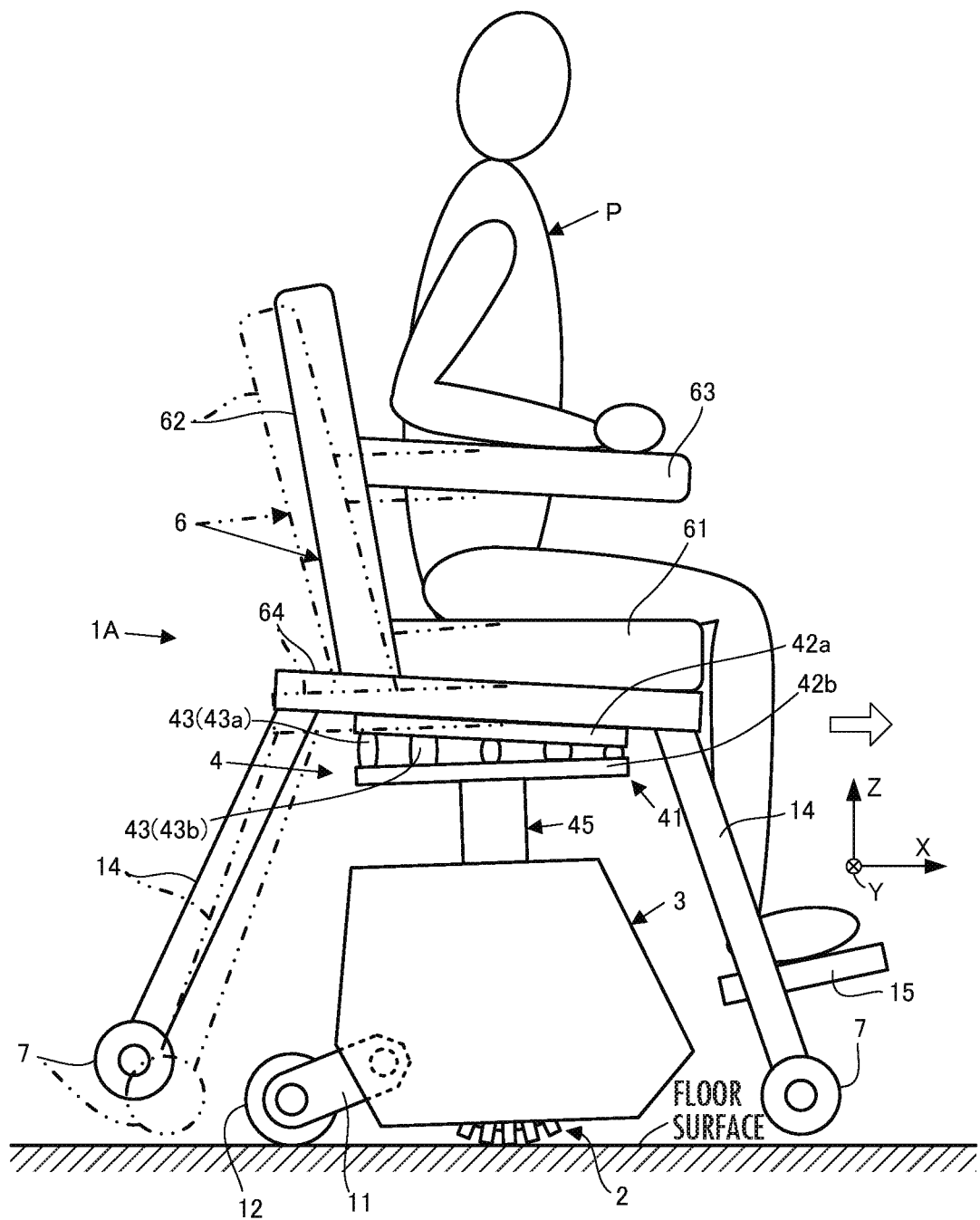
FIG. 7 is an explanatory diagram related to the operation of the mobile body according to the first embodiment.
Figure 8:
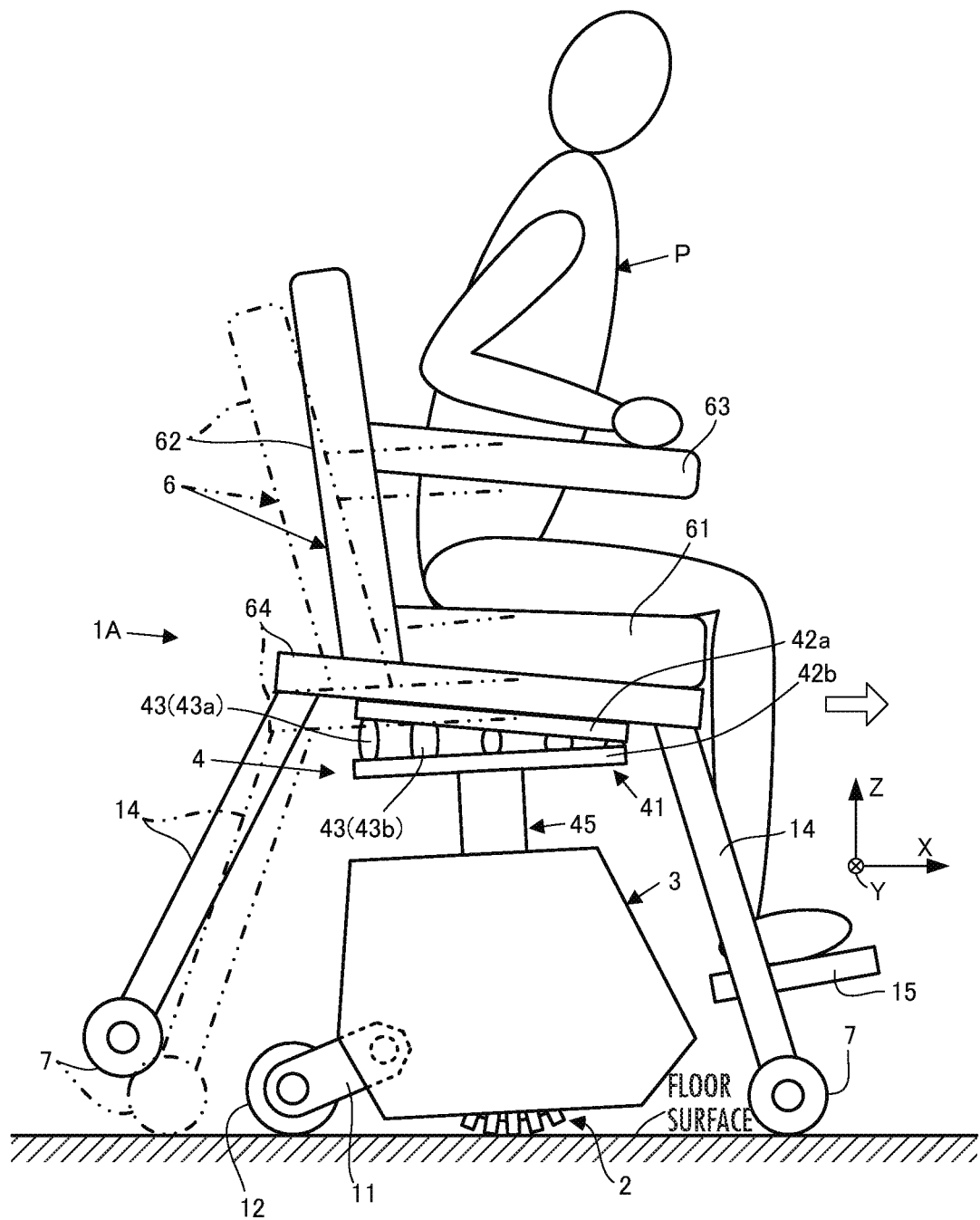
FIG. 8 is an explanatory diagram related to the operation of the mobile body according to the first embodiment.

Thus, when the overall center of gravity of the mobile body 1A is moved forward by the user P tilting his or her upper body forward, the movement operation section 2 quickly moves to directly under the overall center of gravity due to the movement control of the movement operation section 2 by the movement control unit 80a, so that the base body 3 tilts rearward, as illustrated in FIG. 7 or FIG. 8. In this case, the rearward tilting degree of the base body 3 increases as the required speed of the mobile body 1A increases.

Here, if the occupant riding section 6 were connected by a high-rigidity connection mechanism to the base body 3 (in other words, if the occupant riding section 6 were connected to the base body 3 in such a manner as to tilt integrally with the base body 3 with respect to the floor surface), then the occupant riding section 6 would tilt rearward together with the base body 3, as indicated by the two-dot chain lines in FIG. 7 or FIG. 8, so that the auxiliary wheel 7 on the rear side of the occupant riding section 6 would come down, approaching the floor surface.

Further, if the required speed of the mobile body 1A were relatively high, then the auxiliary wheels 7 on the rear side would inconveniently come in contact with the floor surface, as indicated by the two-dot chain lines in FIG. 8. Consequently, the base body 3 would not be allowed to tilt further rearward, and the floor reaction force acting on the auxiliary wheels 7 on the rear side would cause a moment in a forward tilt direction (a moment in a direction for moving the overall center of gravity further forward) to act on the occupant riding section 6. As a result, a state in which the balanced state of the overall center of gravity cannot be accomplished would inconveniently continue, causing the movement operation section 2 to be controlled to accelerate such that the moving speed in the advancing direction would continuously increase.

Thus, if the occupant riding section 6 were connected to the base body 3 by the high-rigidity connection mechanism, then a high required speed of the mobile body 1A would cause the auxiliary wheels 7 on the rear side to come in contact with the ground, interfering with the rearward tilting of the base body 3. Consequently, the movement operation section 2 would be inconveniently accelerated to an excessive degree.

Meanwhile, according to the present embodiment, the elastic deformation of the elastic members 43 of the elastic structure 41 enables the occupant riding section 6 to rock with respect to the base body 3. Hence, when the base body 3 tilts rearward as described above, the occupant riding section 6 elastically rocks in the forward tilt direction with respect to the lower plate 42b of the elastic structure 41, as indicated by the solid lines in FIG. 7 or FIG. 8. Consequently, the auxiliary wheels 7 on the rear side of the occupant riding section 6 move up off the floor surface and the auxiliary wheels 7 on the front side move down, approaching the floor surface.

Further, if the required speed of the mobile body 1A is relatively high, then the auxiliary wheels 7 on the front side of the occupant riding section 6 come in contact with the floor surface, as indicated by the solid lines in FIG. 8. At this time, a moment in the rearward tilt direction (a moment in a direction for returning the overall center of gravity to the rearward side) acts on the occupant riding section 6 due to the floor reaction force acting on the auxiliary wheels 7 on the front side. As a result, the movement operation section 2 under movement control to accomplish the balanced state of the overall center of gravity decelerates and eventually converges to a steady moving speed.

As described above, according to the present embodiment, the occupant riding section 6 can elastically rock with respect to the base body 3, thus making it possible to prevent, when the mobile body 1A moves forward, the rearward tilting of the base body 3 from being blocked by the auxiliary wheels 7 on the rear side coming in contact with the ground. As a result, the mobile body 1A can smoothly move forward.

Further, when the required speed of the mobile body 1A in the forward direction based on the forward tilting of the upper body of the user P is high, the auxiliary wheels 7 on the front side can be brought into contact with the floor surface by the forward tilting of the occupant riding section 6. This makes it possible to prevent the movement operation section 2 from being excessively accelerated in the advancing direction.

Such an effect can be obtained also when, for example, the user P tilts his or her upper body relatively considerably to the right side or the left side in order to turn the mobile body 1A to the right side or the left side. More specifically, when the user P tilts his or her upper body to the right side to turn the mobile body 1A to the right side, the base body 3 tilts leftward, but the occupant riding section 6 elastically rocks to the right tilting side with respect to the base body 3. Hence, even when the user P tilts his or her upper body rightward to a relatively large extent, the auxiliary wheels 7 on the left side of the occupant riding section 6 will not interfere with the leftward tilting of the base body 3, and the auxiliary wheels 7 on the right side of the occupant riding section 6 come in contact with the floor surface. This makes it possible to prevent the movement operation section 2 from being excessively accelerated rightward.

Further, when the user P tilts his or her upper body to the left to turn the mobile body 1A to the left, the base body 3 tilts rightward, but the occupant riding section 6 elastically rocks to the left tilting side with respect to the base body 3. Consequently, even when the user P tilts his or her upper body leftward to a relatively large extent, the auxiliary wheels 7 on the right side of the occupant riding section 6 will not interfere with the rightward tilting of the base body 3, and the auxiliary wheels 7 on the left side of the occupant riding section 6 come in contact with the floor surface. This makes it possible to prevent the movement operation section 2 from being excessively accelerated leftward.

Figure 9:
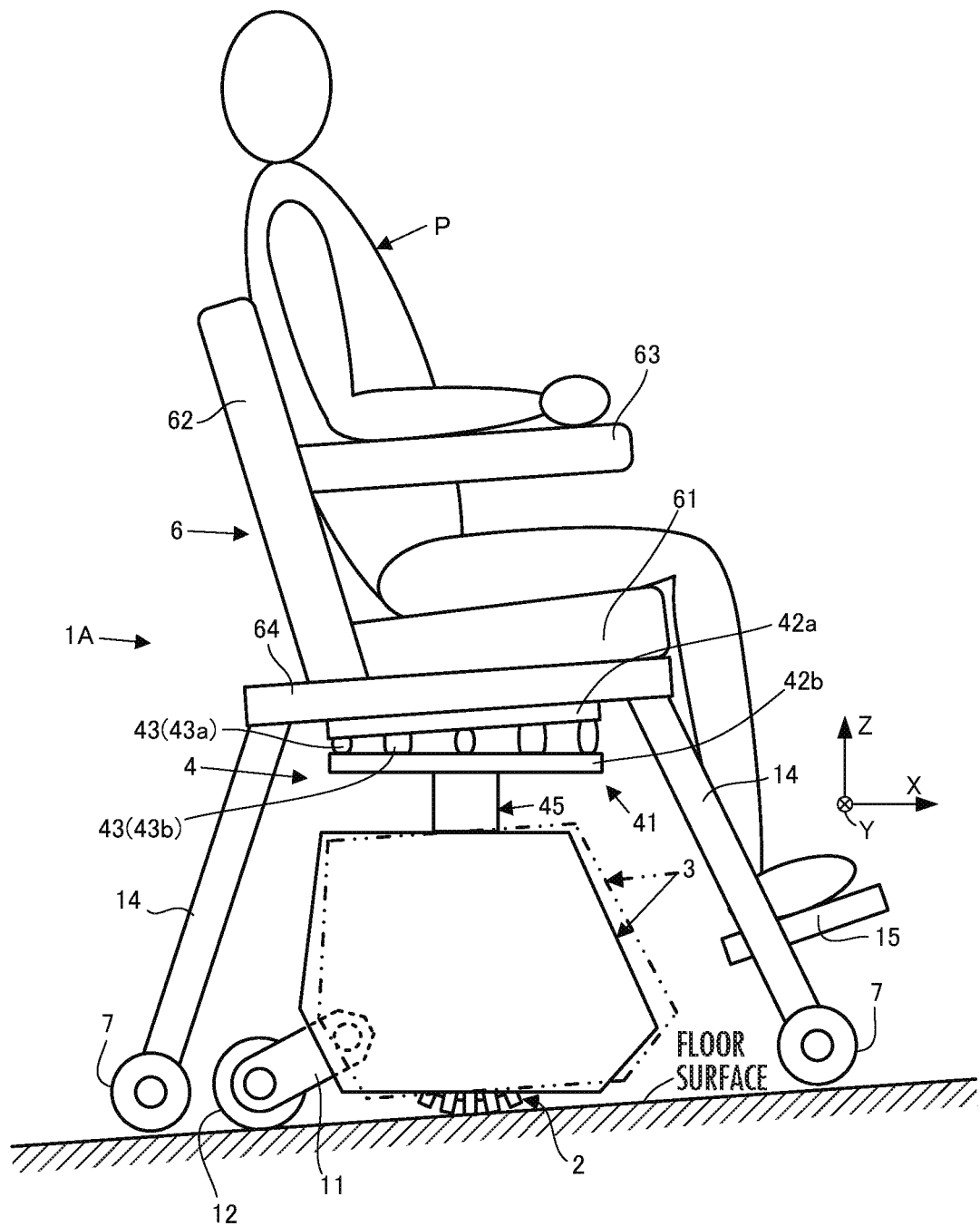
FIG. 9 is an explanatory diagram related to the operation of the mobile body according to the first embodiment.

Further, the mobile body 1A of the present embodiment can provide an effect described below when the user P gets on the occupant riding section 6 on a slanted floor surface and starts moving the mobile body 1A. It is assumed that, for example, a spot on the floor surface where the user P gets on the mobile body 1A is slightly slanted upward forwardly with respect to the mobile body 1A, as illustrated in FIG. 9.

In this case, after the user P gets on the occupant riding section 6 in the state in which the plurality of auxiliary wheels 7 at the front, rear, left and right of the occupant riding section 6 are in contact with the floor surface (the D1>D2 state), if the user P performs a drive start operation through the operation unit 82, then the lifting control unit 80b of the control device 80 operates the lifting actuator 55 to relatively raise the occupant riding section 6 with respect to the base body 3. Thus, the operation of raising the occupant riding section 6 is performed, and the state of the mobile body 1A will be shifted from the D1>D2 state to the D1<D2 state.

Then, in the middle of the raising operation, when the movement operation section 2 comes in contact with the floor surface, leading to the D1=D2 state, the movement control unit 80a of the control device 80 starts the foregoing movement control of the movement operation section 2. In this case, since the floor surface is slanted upward forwardly with respect to the mobile body 1A as described above, the base body 3 tilts rearward together with the occupant riding section 6 with respect to the vertical direction (the gravitational direction), as indicated by the two-dot chain lines in FIG. 9 when the movement control of the movement operation section 2 is started.

Further, when the movement control of the movement operation section 2 is started, normally, the user P frequently has not yet tilted his or her upper body forward. For this reason, as described above, the overall center of gravity of the mobile body 1A is frequently positioned on the rear side relative to directly above the ground contact portion of the movement operation section 2 when the movement control of the movement operation section 2 is started on the slanted floor surface. Further, in this case, immediately after starting the movement control of the movement operation section 2, the movement operation section 2 is controlled to move in the rearward direction.

Here, immediately after the movement control of the movement operation section 2 is started, the auxiliary wheels 7 at the front, rear, left and right of the occupant riding section 6 are hardly off the floor surface or in contact with the floor surface as illustrated in FIG. 9, so that the occupant riding section 6 can hardly tilt with respect to the floor surface.

Consequently, if the occupant riding section 6 were connected to the base body 3 by a high-rigidity connection mechanism (i.e., if the occupant riding section 6 were connected to the base body 3 such that the occupant riding section 6 tilts integrally with the base body 3 with respect to the floor surface), then the mobile body 1A would inconveniently be accelerated in the rearward direction immediately after the movement control of the movement operation section 2 is started.

On the other hand, according to the present embodiment, the elastic deformation of the elastic member 43 of the elastic structure 41 enables the occupant riding section 6 to rock with respect to the base body 3. In addition, immediately after the movement operation section 2 starts to come in contact with the ground (immediately after the movement control of the movement operation section 2 is started), the rigidity of the elastic structure 41 is low as described above. Thus, the movement operation section 2 slightly moves in the rearward direction immediately after the movement control of the movement operation section 2 is started, and the occupant riding section 6 quickly rocks relatively in the rearward direction with respect to the base body 3 (i.e., the base body 3 relatively tilts in the forward tilt direction with respect to the occupant riding section 6), as indicated by the solid lines in FIG. 9.

With this arrangement, the ground contact portion of the movement operation section 2 can move to directly under the overall center of gravity, so that the balanced state of the overall center of gravity can be accomplished. This makes it possible to prevent the mobile body 1A from being accelerated in the rearward direction immediately after the movement control of the movement operation section 2 is started.

The effect described above can be obtained also in the case where a floor surface where the user P gets on the mobile body 1A is slanted upward rearwardly with respect to the mobile body 1A, or slanted upward rightwardly or leftwardly rather than being limited to the case where the floor surface is slanted upward forwardly.

Second Embodiment

A second embodiment of the present invention will now be described with reference to FIG. 10 to FIG. 13. A mobile body 1B of the present embodiment differs from the mobile body of the first embodiment only partly in configuration. Therefore, a description of the same items as in the first embodiment will be omitted.

Figure 10:
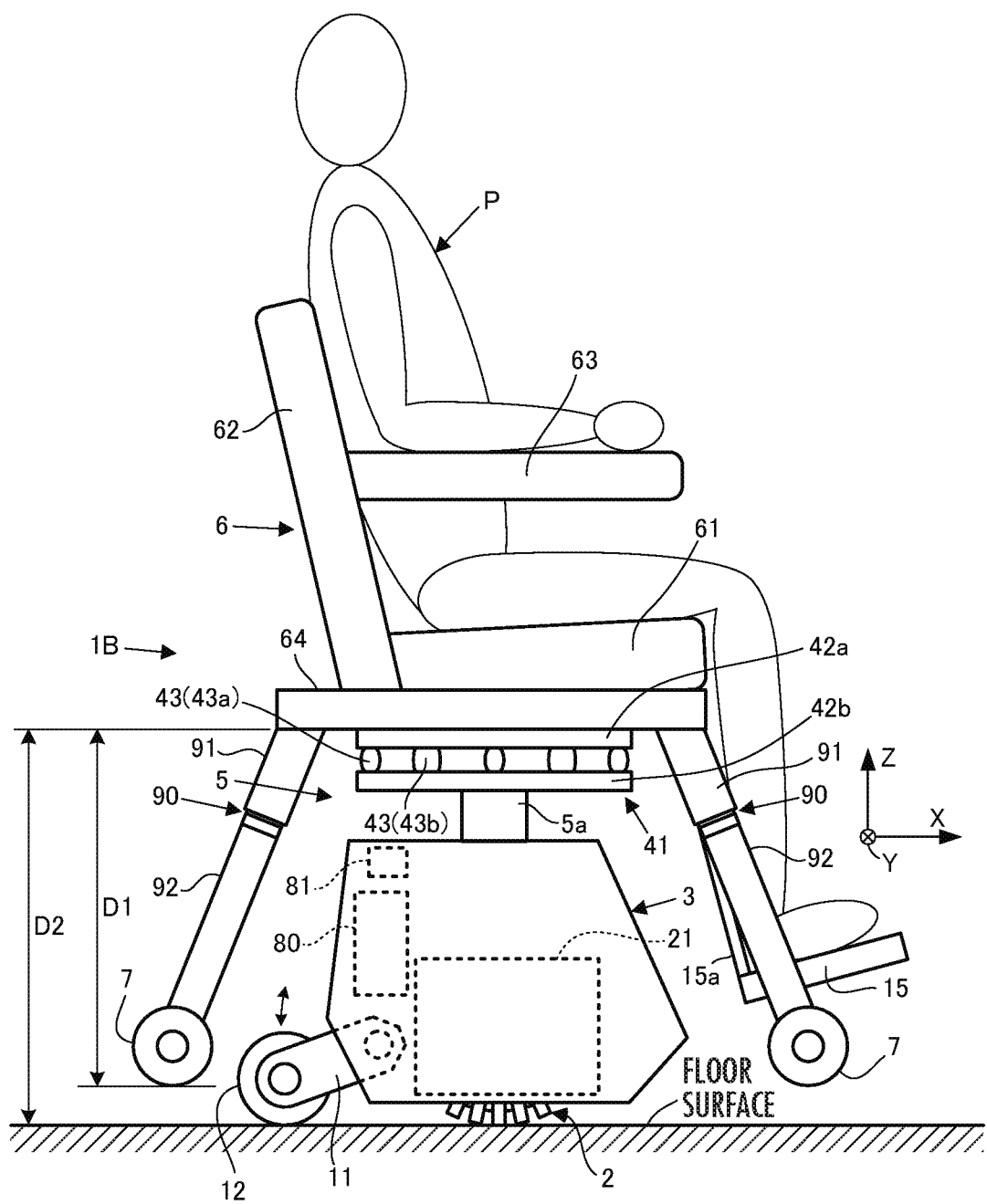
FIG. 10 is a side view illustrating a mobile body according to a second embodiment, a movement operation section thereof being in contact with the ground.
Figure 11:
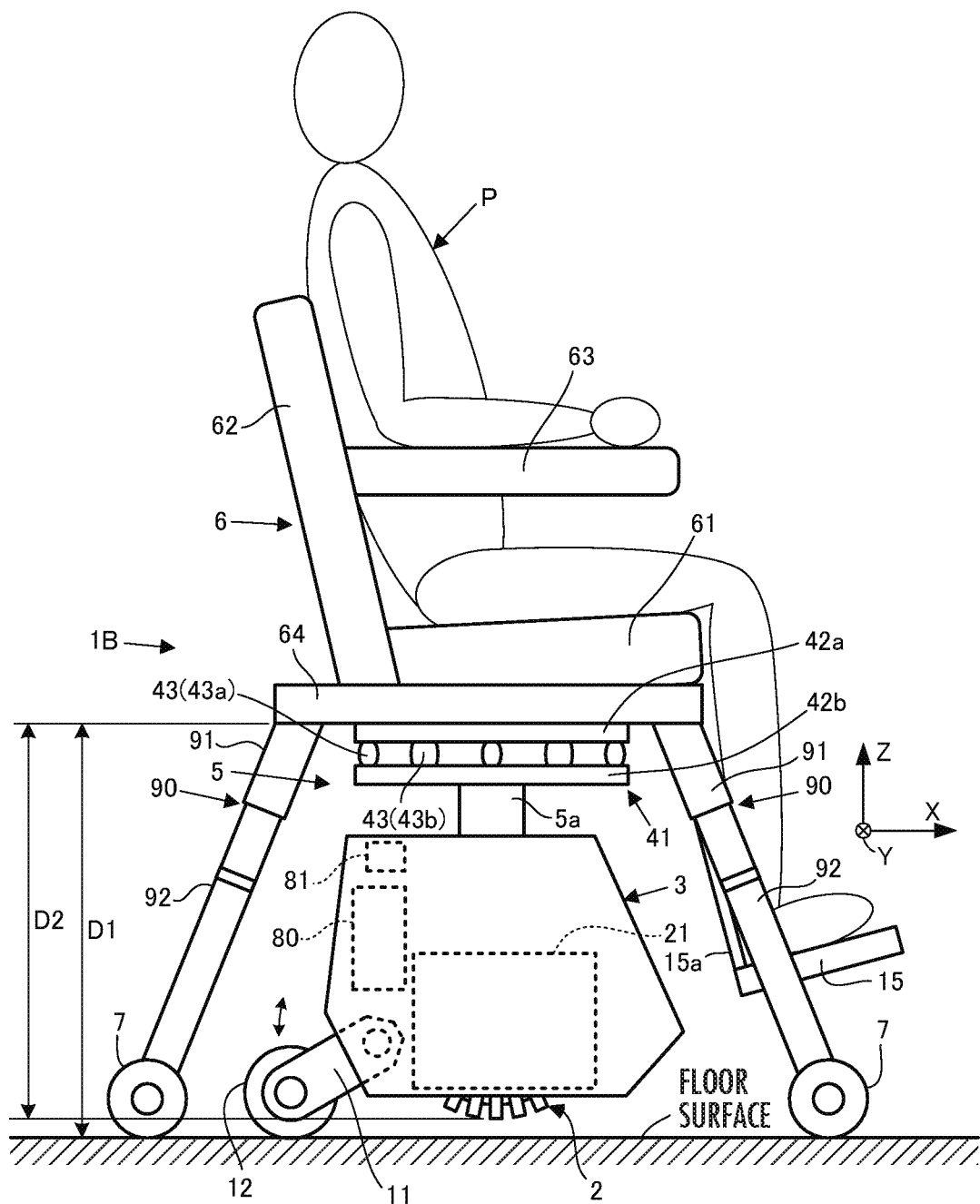
FIG. 11 is a side view illustrating the mobile body according to the second embodiment, auxiliary ground contact sections (auxiliary wheels) being in contact with the ground.

Referring to FIG. 10 and FIG. 11, in the present embodiment, an occupant riding section 6 is connected to a base body 3 through the intermediary of a connection mechanism 5 having an elastic structure 41 described in the first embodiment and a connection member 5a that connects the elastic structure 41 to the base body 3. In this case, a lower plate 42b of the elastic structure 41 is fixed to the base body 3 through the connection member 5a. The lower plate 42b may alternatively be fixed directly to the upper surface of the base body 3.

Further, in the present embodiment, auxiliary wheels 7 serving as auxiliary ground contact sections are individually connected to the occupant riding section 6 through a plurality of (the same number as that of the auxiliary wheels 7) extensible leg mechanisms 90 extended around the base body 3 obliquely downward from a seat frame 64 of the occupant riding section 6. As with the first embodiment, the auxiliary wheels 7 are disposed at the front side and the rear side of the occupant riding section 6, one pair each at left and right.

Each of the leg mechanisms 90 has a cylindrical upper leg 91 with the upper end portion thereof fixed to the seat frame 64 and a lower leg 92 with the upper portion thereof slidably inserted in the upper leg 91. Further, as with the first embodiment, each of the auxiliary wheels 7 is pivotally supported by the lower end portion of the lower leg 92 so as to be rollable on a floor surface and also turnable in the yaw direction. In addition, the auxiliary wheels 7 are attached to the lower legs 92 such that braking by a frictional force or the like is applied when the auxiliary wheels 7 roll.

Figure 12B:
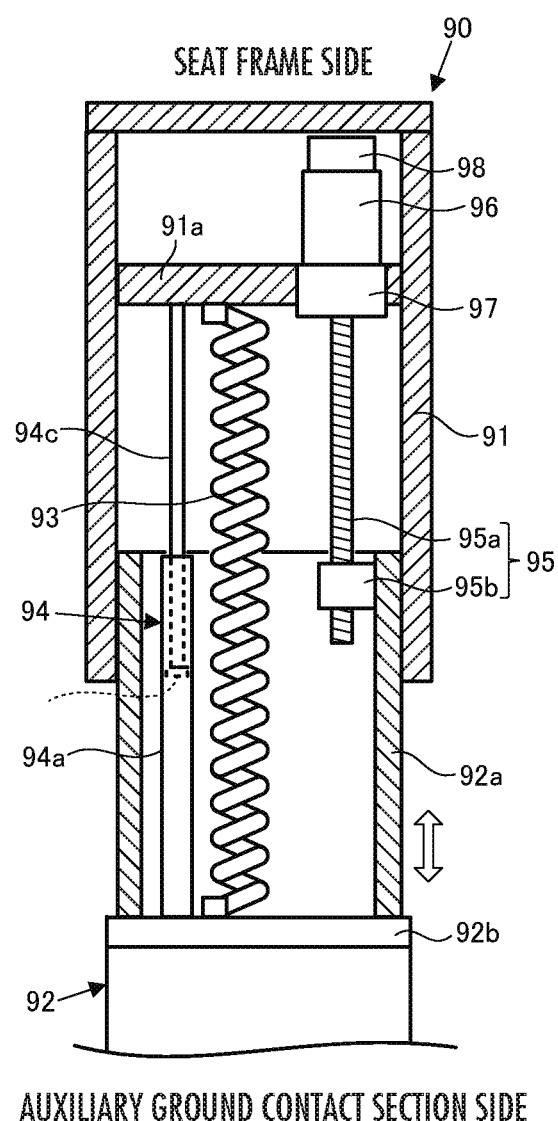
Figure 13:
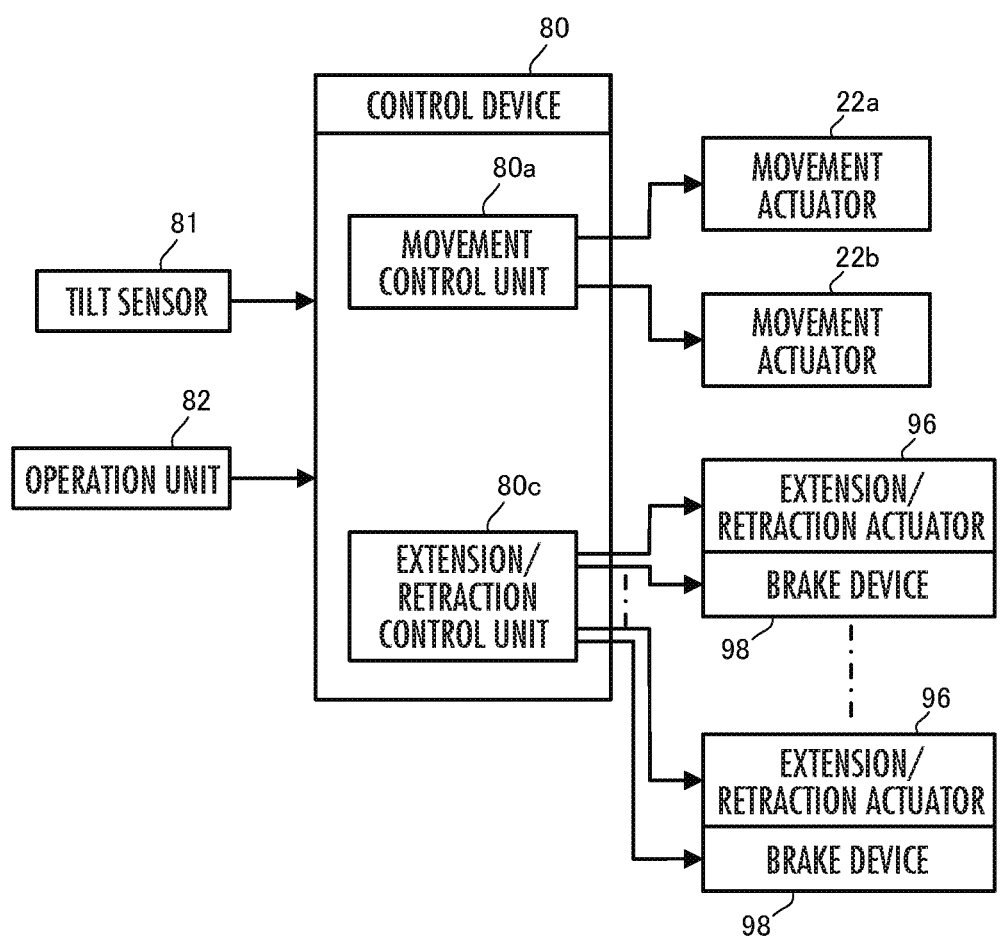
FIG. 13 is a block diagram illustrating a configuration related to the control of the mobile body according to the second embodiment.

A more detailed configuration of each of the leg mechanisms 90 will be described with reference to FIG. 12A and FIG. 12B. The lower leg 92 of each of the leg mechanisms 90 has, on the top thereof, a cylindrical portion 92a that is formed to open upward, and the cylindrical portion 92a is inserted from bottom into the cylindrical upper leg 91 such that the cylindrical portion 92a can slide in the axial direction (the direction in which the leg mechanism 90 extends) with respect to the upper leg 91.

Further, as the cylindrical portion 92a slides with respect to the upper leg 91, the leg mechanism 90 extends or retracts. In this case, as illustrated in FIG. 10 or FIG. 11, each of the leg mechanisms 90 extends obliquely downward from the seat frame 64, so that the auxiliary wheel 7 at the lower end portion of the leg mechanism 90 moves down as the leg mechanism 90 extends, and the auxiliary wheel 7 moves up as the leg mechanism 90 retracts. Thus, each of the leg mechanisms 90 is configured to enable the auxiliary wheel 7 at the lower end portion thereof to move up/down.

The leg mechanism 90 further includes a pedestal plate 91a formed inside the upper leg 91 at a position close to the upper end portion of the upper leg 91, a pedestal plate 92b formed at a lower end portion of the cylindrical portion 92a of the lower leg 92, a coil spring 93 and a damper 94 interposed between the pedestal plates 91a and 92b in such a manner as to be extendable and contractable or retractable in the axial direction of the upper leg 91, and an extension/retraction actuator 96 that outputs a driving force for moving the cylindrical portion 92a of the lower leg 92 relatively in the axial direction with respect to the upper leg 91 (consequently extending or retracting the leg mechanism 90) through the intermediary of a ball screw mechanism 95 having a screw portion 95a and a nut portion 95b.

The extension/retraction actuator 96 is composed of, for example, an electric motor mounted on the upper side of the pedestal plate 91a, and the rotating shaft thereof (not illustrated) is connected to the screw portion 95a of the ball screw mechanism 95 through the intermediary of a reduction gear 97. The screw portion 95a extends under the pedestal plate 91a in the axial direction of the upper leg 91 (in the extension/retraction direction of the leg mechanism 90). Further, the nut portion 95b fitted to the screw portion 95a is fixed to the inner peripheral surface of the cylindrical portion 92a of the lower leg 92.

Consequently, as the screw portion 95a of the ball screw mechanism 95 is rotatively driven by the extension/retraction actuator 96, the nut portion 95b and the lower leg 92 move in the axial direction with respect to the upper leg 91, thereby causing the leg mechanism 90 to extend or retract. As a result, a distance D1 from the seat frame 64 to the lower end of the auxiliary wheel 7 at the lower end portion of the leg mechanism 90 changes (the auxiliary wheel 7 at the lower end portion of the leg mechanism 90 moves up or down with respect to the occupant riding section 6).

The transmission of motive power from the extension/retraction actuator 96 to the lower leg 92 may alternatively be performed by a rotation-linear motion conversion mechanism other than the ball screw mechanism 95. Further, the extension/retraction actuator 96 can be composed of a linear motion actuator, and the lower leg 92 can be directly slid against the upper leg 91 by the linear motion actuator.

The extension/retraction actuator 96 is provided with an electric brake device 98 capable of non-rotatably locking the rotating shaft of the extension/retraction actuator 96. The brake device 98 corresponds to the locking mechanism in the present invention, and has the same configuration as, for example, the brake device 57 in the first embodiment.

The coil spring 93 has a function as the first spring member and the second spring member in the present invention. The coil spring 93 has the two ends thereof connected to the pedestal plates 91a and 92b, respectively in a state in which the axis of the coil spring 93 is oriented in the axial direction of the upper leg 91. The coil spring 93 is compressed between the pedestal plates 91a and 92b and generates an elastic force in a direction in which the leg mechanism 90 extends. The elastic force increases as the cylindrical portion 92a of the lower leg 92 enters into the upper leg 91 (as the leg mechanism 90 retracts).

The damper 94 has a cylindrical portion 94a, a piston 94b, and a rod 94c, as with the damper 53 in the first embodiment. Further, in the damper 94, an end of the cylindrical portion 94a (the end on the opposite side from the rod 94c) is fixed to the pedestal plate 92b, and the distal end of the rod 94c is fixed to the pedestal plate 91a in a state in which the axis of the damper 94 is oriented in the axial direction of the upper leg 91. Thus, as the leg mechanism 90 extends or retracts, the rod 94c exposed from the cylindrical portion 94a extends or retracts.

Further, the damper 94 is configured to generate viscous resistance by a fluid, such as a hydraulic oil, in the cylindrical portion 94a, which circulates through an orifice (not illustrated) as the rod 94c extends or retracts. In this case, according to the present embodiment, the damper 94 is configured such that the viscous resistance obtained when the rod 94c extends (when the leg mechanism 90 extends) is higher than the viscous resistance obtained when the rod 94c retracts (when the leg mechanism 90 retracts).

The vertical relationship between the cylindrical portion 94a of the damper 94 and the rod 94c exposed therefrom may be reversed from the above, and the end of the cylindrical portion 94a may be fixed to the pedestal plate 91a and the distal end of the rod 94c may be fixed to the pedestal plate 92b.

Further, according to the present embodiment, a foot rest 15 is connected through appropriate connection members 15a to the upper legs 91 of the left and right leg mechanisms 90 on the front side of the occupant riding section 6, as illustrated in FIG. 10 and FIG. 11. Hence, the position of the foot rest 15 with respect to the occupant riding section 6 is not influenced by the extension and retraction of the left and right leg mechanisms 90 on the front side.

The mechanical configuration of the mobile body 1B of the present embodiment is the same as that of the first embodiment except for the items described above.

Here, the relationship between a distance D2 from the seat frame 64 of the occupant riding section 6 to the lower end portion of a movement operation section 2 and the amount of extension/retraction of each of the leg mechanisms 90 (the amount of relative displacement of the lower leg 92 with respect to the upper leg 91) will be described. In the present embodiment, the distance D1 from the seat frame 64 to the lower end portion of each of the auxiliary wheels 7 changes as each of the leg mechanisms 90 extends or retracts, while the distance D2 remains substantially at a fixed value.

In the present embodiment, the variable range of the extension/retraction amount of each of the leg mechanisms 90 is set such that each of the leg mechanisms 90 extends or retracts between a state in which each of the leg mechanisms 90 retracts such that the distance D1 is smaller than the distance D2 (hereinafter referred to as "the D1<D2 state") as illustrated in FIG. 10 and a state in which each of the leg mechanisms 90 extends such that the distance D1 is larger than the distance D2 (hereinafter referred to as "the D1>D2 state") as illustrated in FIG. 11.

The D1<D2 state in the present embodiment is a state in which the movement operation section 2 can be brought into contact with a floor surface while the auxiliary wheels 7 are held above the floor surface, as illustrated in FIG. 10. This state is the same as FIG. 1 of the first embodiment, and the mobile body 1B can be moved by driving the movement operation section 2. Further, in this state, as with the first embodiment, the base body 3 can tilt, the occupant riding section 6 can rock with respect to the base body 3, and excessive tilting of the occupant riding section 6 will be limited by the auxiliary wheels 7 coming in contact with the ground.

Further, the D1>D2 state in the present embodiment is a state in which the auxiliary wheels 7 can be brought into contact with the floor surface while the movement operation section 2 is held above the floor surface, as illustrated in FIG. 11 (the same state as that illustrated in FIG. 2 of the first embodiment). In this state, as with the first embodiment, the attitude of the occupant riding section 6 with respect to the floor surface is maintained to be substantially constant (e.g., an attitude at which the seat frame 64 is substantially parallel to the floor surface). Further, the mobile body 1B cannot be moved even if the movement operation section 2 is driven.

A supplemental description will be given of the elastic force generated by the coil spring 93 of each of the leg mechanisms 90. If, for example, the power of the extension/retraction actuator 96 and the brake device 98 of each of the leg mechanisms 90 is cut off in the D1<D2 state illustrated in FIG. 10, then each pair of the lower leg 92 and the auxiliary wheel 7 of each of the leg mechanisms 90 moves down in the extending direction of each of the leg mechanisms 90 due to the gravity acting thereon and the elastic force in the extension direction generated by the coil spring 93 (consequently causing each of the leg mechanisms 90 to extend). This causes the auxiliary wheels 7 at the front, rear, left and right of the occupant riding section 6 to come in contact with the floor surface. Then, the contact with the floor surface leads to the D1=D2 state (the state in which the movement operation section 2 and the auxiliary wheels 7 at the front, rear, left and right of the occupant riding section 6 are in contact with the floor surface).

In the D1=D2 state, the total elastic force generated by the coil springs 93 is set such that the ground contact load on the movement operation section 2 can be made sufficiently smaller than the total ground contact load on the auxiliary wheels 7 in contact with the ground, or the ground contact load on the movement operation section 2 can be reduced to zero, as with the case of the first embodiment. Consequently, as with the case of the first embodiment, most or all of the gravity acting on the entire mobile body 1B is supported by the auxiliary wheels 7 in contact with the ground in the D1=D2 state. The total elastic force generated by the coil springs 93 in the D1=D2 state can be set to an elastic force for enabling the movement operation section 2 to move upward off the floor surface.

A description will now be given of the configuration related to the operation control of the mobile body 1B of the present embodiment. As with the first embodiment, the mobile body 1B includes a control device 80 mounted in the base body 3 and a tilt sensor 81. Further, the control device 80 receives command information related to the operation of the mobile body 1B from an operation unit 82, which is attached to an elbow rest 63 or the like of the occupant riding section 6 of the mobile body 1B or which is carried by the user P, in addition to detection signals from the tilt sensor 81.

In this case, the control device 80 has, as a function thereof, a movement control unit 80a that controls the movement of the movement operation section 2, as with the first embodiment. The control processing by the movement control unit 80a is the same as that of the first embodiment.

Further, the control device 80 has, instead of the lifting control unit 80b, an extension/retraction control unit 80c that controls the extension/retraction operation of each of the leg mechanisms 90 (i.e., the raising/lowering operation of the auxiliary wheels 7 with respect to the occupant riding section 6) by controlling the operations of the extension/retraction actuator 96 and the brake device 98 of each of the leg mechanisms 90.

When the user P gets on or off the occupant riding section 6, the extension/retraction control unit 80c operates the extension/retraction actuator 96 and the brake device 98 of each of the leg mechanisms 90 to set the mobile body 1B to the D1>D2 state illustrated in FIG. 11. Then, to move the mobile body 1B by driving the movement operation section 2, the extension/retraction control unit 80c operates the extension/retraction actuator 96 and the brake device 98 of each of the leg mechanisms 90 to set the mobile body 1B to the D1<D2 state illustrated in FIG. 10. Further, if an abnormality, such as an operation failure of the movement operation section 2, occurs while the mobile body 1B is moving, then the extension/retraction control unit 80c operates the extension/retraction actuator 96 and the brake device 98 of each of the leg mechanisms 90 to bring the auxiliary wheels 7 into contact with the ground.

The operation of the mobile body 1B of the present embodiment will now be described in more detail. In a state in which the power of the mobile body 1B is not yet turned on, the auxiliary wheels 7 of the leg mechanisms 90 are in contact with the floor surface by the urging forces of the coil springs 93 of the leg mechanisms 90. When the power switch (not illustrated) of the mobile body 1B is turned on (when the power of the mobile body 1B is turned on) in that state, the control device 80 is started up, setting the mobile body 1B in a standby state (waiting state).

In this standby state, the extension/retraction control unit 80c of the control device 80 operates the extension/retraction actuator 96 of each of the leg mechanisms 90 to set the mobile body 1B to the D1>D2 state illustrated in FIG. 11. This causes the leg mechanisms 90 to extend to a predetermined length while the auxiliary wheels 7 are rolling, thereby relatively raising the base body 3 with respect to the auxiliary wheels 7 and moving the movement operation section 2 upward off the floor surface.

Then, when the leg mechanisms 90 extend to the predetermined length (consequently causing the base body 3 to move up to a predetermined height position with respect to the occupant riding section 6), the extension/retraction control unit 80c operates the brake device 98 of each of the leg mechanisms 90 to a locked state. Thus, the extension or retraction of the leg mechanisms 90 is locked thereby to lock the relative raising/lowering of the base body 3 with respect to the auxiliary wheels 7 (to consequently maintain the D1>D2 state). Then, after operating the brake device 98 of each of the leg mechanisms 90 to the locked state, the extension/retraction control unit 80c cuts off the supply of power to the extension/retraction actuator 96 of each of the leg mechanisms 90.

As with the first embodiment, the user P gets on the occupant riding section 6 by sitting on a seat 61 before the power of the mobile body 1B is turned on or after the mobile body 1B is set to the standby state by turning on the power of the mobile body 1B. Then, the user P performs the operation for starting the drive of the mobile body 1B through the operation unit 82 in the standby state. Consequently, an operation start command is output from the operation unit 82 to the control device 80.

At this time, the extension/retraction control unit 80c of the control device 80 cuts off the supply of power to the brake device 98 of each of the leg mechanisms 90 thereby to clear the locked state of the brake device 98. This unlocks the extension/retraction of each of the leg mechanisms 90.

Further, the extension/retraction control unit 80c operates the extension/retraction actuator 96 of each of the leg mechanisms 90 to change the state of the mobile body 1B from the D1>D2 state illustrated in FIG. 11 to the D1<D2 state illustrated in FIG. 10. To be specific, the extension/retraction control unit 80c operates the extension/retraction actuator 96 of each of the leg mechanisms 90 to retract each of the leg mechanisms 90 to a predetermined length. This causes the auxiliary wheels 7 to relatively move up by a predetermined amount with respect to the base body 3 (i.e., the base body 3 moves down by the predetermined amount with respect to the auxiliary wheels 7), thus shifting the state of the mobile body 1B from the D1>D2 state to the D1<D2 state. More specifically, the movement operation section 2 moves down from the D1>D2 state to come in contact with the floor surface, and the auxiliary wheels 7 move upward off the floor surface. Consequently, the mobile body 1B shifts to the D1<D2 state.

Then, when the raising of the auxiliary wheels 7 by the predetermined amount with respect to the base body 3 is completed, the extension/retraction control unit 80c operates the brake device 98 of each of the leg mechanisms 90 to the locked state thereby to lock the extension/retraction of each of the leg mechanisms 90. This locks the relative raising/lowering of the base body 3 and the occupant riding section 6. Further, after the brake device 98 of each of the leg mechanisms 90 is operated to the locked state, the extension/retraction control unit 80c cuts off the supply of power to the extension/retraction actuator 96 of each of the leg mechanisms 90.

Further, in the process of the mobile body 1B shifting from the D1>D2 state to the D1<D2 state as described above, after the movement operation section 2 comes in contact with the floor surface, the ground contact load on the movement operation section 2 increases, whereas the overall ground contact load on the auxiliary wheels 7 decreases, as with the first embodiment. This causes the rigidity of the elastic structure 41 to increase, as with the first embodiment. Hence, the rigidity of the elastic structure 41 becomes relatively low immediately after the movement operation section 2 starts to come in contact with the ground (immediately before the auxiliary wheels 7 start to move up), but thereafter, the rigidity of the elastic structure 41 increases as the ground contact load on the movement operation section 2 increases (as the overall ground contact load on the auxiliary wheels 7 decreases).

Then, when the state shifts to the state in which the entire auxiliary wheels 7 move up from the floor surface (the D1<D2 state), both low-rigidity elastic members 43a and high-rigidity elastic members 43b of the elastic structure 41 are compressed between plates 42a and 42b.

Therefore, as with the first embodiment, in the state in which the auxiliary wheels 7 are in contact with the floor surface such that the ground contact load acts thereon, the rigidity of the elastic structure 41 will be lower than that in the state in which the entire auxiliary wheels 7 are held above the floor surface (i.e., the state in which the entire auxiliary wheels 7 are not in contact with the ground).

In the middle of the retracting operation of each of the leg mechanisms 90, if the state becomes D1=D2 state or close thereto, or if a load sensor or the like (not illustrated) detects that the movement operation section 2 has come in contact with the floor surface, then the movement control unit 80a of the control device 80 starts controlling the movement of the movement operation section 2, as with the first embodiment.

Thus, the movement of the movement operation section 2 is controlled such that a braking force acts on the movement operation section 2 (the moving speed converges to zero) until the retracting operation of each of the leg mechanisms 90 is completed. Further, after the retracting operation of each of the leg mechanisms 90 is completed, the control is performed such that movement operation section 2 moves according to the movement of the overall center of gravity caused by the movement of the upper body of the user P.

Further, as with the first embodiment, if the occurrence of an abnormality, such as an operation failure of the movement operation section 2, is detected or if the user P performs an operation for forcibly stopping the drive of the mobile body 1B through the operation unit 82 during an operation following the standby state of the mobile body 1B, then the control device 80 cuts off the supply of power to the movement actuators 22a, 22b, the extension/retraction actuator 96 and the brake device 98 of each of the leg mechanisms 90 to stop the operations thereof.

At this time, unlocking the extension/retraction of each of the leg mechanisms 90 causes each of the leg mechanisms 90 to extend by the urging force (the elastic force in the extension direction) of the coil spring 93, consequently bringing the auxiliary wheel 7 at the lower end portion of each of the leg mechanisms 90 into contact with a floor surface. Consequently, the occupant riding section 6 is maintained at a constant attitude state with respect to the floor surface.

Further, in this case, the viscous resistance generated by the damper 94 of each of the leg mechanisms 90 prevents rapid extension of each of the leg mechanisms 90. This makes it possible to ease the impact when the auxiliary wheels 7 land.

In addition, after the auxiliary wheels 7 land, the overall elastic force of the coil springs 93 of the leg mechanisms 90 makes the floor reaction force acting on the movement operation section 2 sufficiently small or zero. Therefore, even when the movement operation section 2 is being driven by the movement actuators 22a, 22b, the mobile body 1B is prevented from being moved by the drive of the movement operation section 2.

Further, according to the present embodiment, as with the first embodiment, the elastic deformation of the elastic members 43 of the elastic structure 41 enables the occupant riding section 6 to elastically rock with respect to the base body 3, so that the effect described with reference to FIG. 7 to FIG. 9 can be obtained, as with the first embodiment.

Third Embodiment

A description will now be given of a third embodiment of the present invention with reference to FIG. 14 to FIG. 16B. A mobile body 1C of the present embodiment differs from the mobile body of the first embodiment only partly in configuration. Therefore, a description of the same items as in the first embodiment will be omitted.

Figure 14:
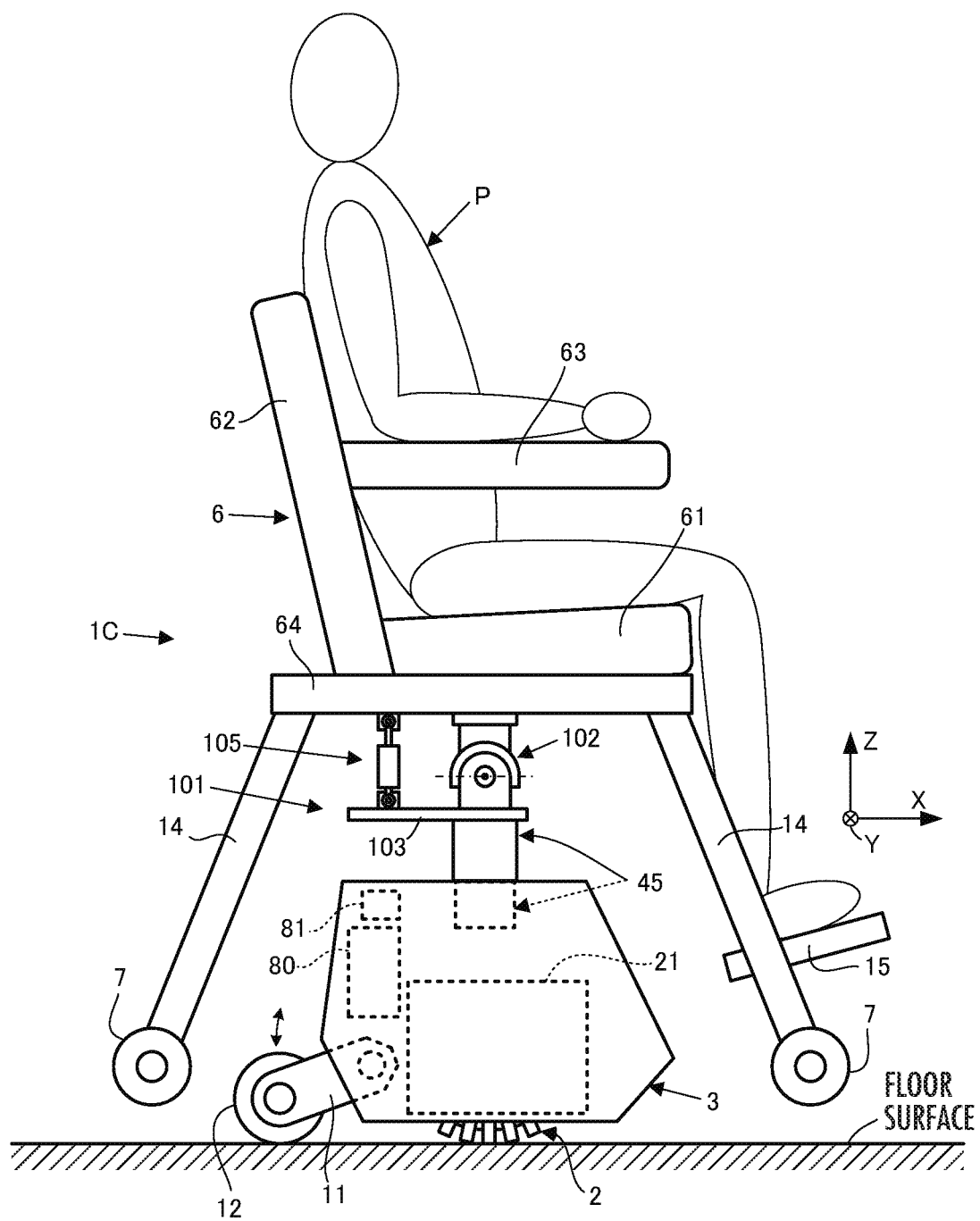
FIG. 14 is a side view illustrating a mobile body according to a third embodiment, a movement operation section thereof being in contact with the ground.

Referring to FIG. 14, in the present embodiment, an occupant riding section 6 is connected to a base body 3 through the intermediary of a connection mechanism 101 having a joint 102 that enables the occupant riding section 6 to relatively rock with respect to the base body 3, an actuator mechanism 105 which generates, in a pseudo manner, an elastic force related to the rocking of the occupant riding section 6, and a lifting mechanism 45 described in the first embodiment.

The joint 102 is composed of, for example, a universal joint having a two-axis rotating shaft, one end portion thereof being swingable in any direction with respect to the other end portion thereof. Further, one end portion of the joint 102 (the lower end portion in FIG. 14) is fixed to a plate 103 fixed to an upper end surface of the lifting mechanism, and the other end portion thereof (the upper end in FIG. 14) is fixed to a seat frame 64 of the occupant riding section 6. With this arrangement, the occupant riding section 6 can rock in any direction with respect to the base body 3 by the operation of the joint 102 and can move up or down with respect to the base body 3 by the operation of the lifting mechanism 45.

Figure 15:
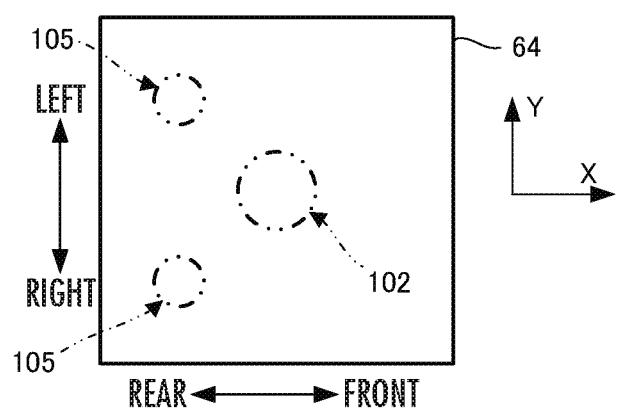
FIG. 15 is an explanatory diagram related to the placement of actuator mechanisms of the mobile body according to the third embodiment.
Figure 17:
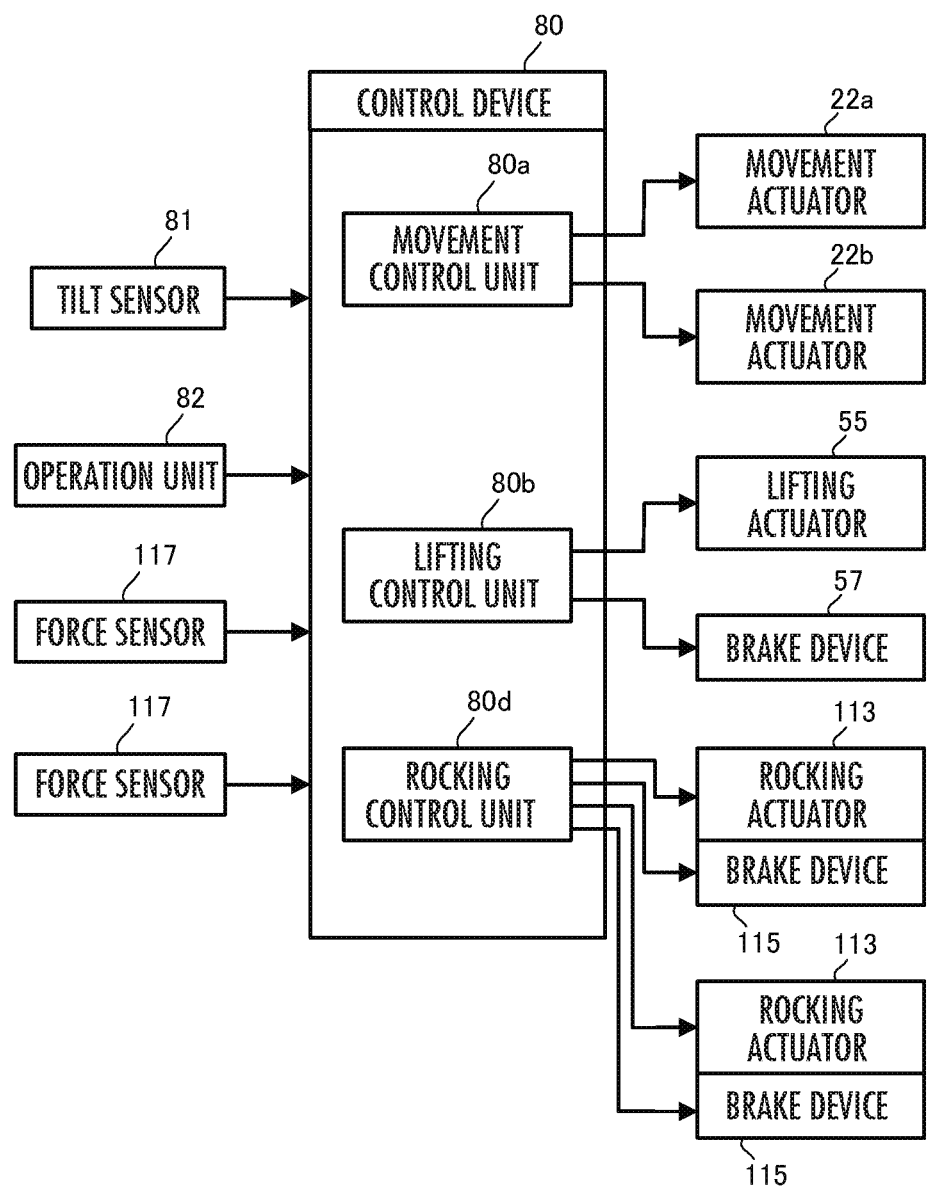
FIG. 17 is a block diagram illustrating the configuration related to the control of the mobile body according to the third embodiment.

Although FIG. 14 illustrates the single actuator mechanism 105, two actuator mechanisms 105, 105 are placed between the seat frame 64 and the plate 103 in the present embodiment. These actuator mechanisms 105, 105 are disposed, for example, in the lateral direction (the Y-axis direction) at the rear side around the joint 102, as illustrated in FIG. 15. FIG. 15 schematically illustrates the relative positional relationship of the joint 102 and the actuator mechanisms 105 with respect to the seat frame 64 when the seat frame 64 is viewed from above.

Each of the actuator mechanisms 105 is configured as illustrated in, for example, FIG. 16A and FIG. 16B. To be specific, each of the actuator mechanisms 105 includes a cylindrical outer guide member 110, a cylindrical inner guide member 111 slidably inserted in the outer guide member 110, and a rocking actuator 113 which outputs a driving force for moving the inner guide member 111 with respect to the outer guide member 110 through the intermediary of, for example, a ball screw mechanism 112 having a screw portion 112a and a nut portion 112b.

The outer guide member 110 is placed, with the axis thereof oriented in the vertical direction, between the seat frame 64 and the plate 103. Further, a joint member 122 connected to the lower end portion of the outer guide member 110 through a rod 121 is pivotably supported by the plate 103 through a bearing 123. Consequently, the outer guide member 110 is connected to the plate 103 in such a manner as to be enabled to rock with respect to the plate 103.

A rod 124 is extended upward from the upper end portion of the inner guide member 111. The rod 124 penetrates the upper end portion of the outer guide member 110, projecting above the outer guide member 110. Further, a joint member 125 mounted on the upper end portion of the rod 124 is pivotably supported by the seat frame 64 through a bearing 126. Thus, the inner guide member 111 is connected to the seat frame 64 in such a manner as to be enabled to rock together with the outer guide member 110 with respect to the seat frame 64.

Further, a force sensor 117, which detects a load acting on the rod 124, is interposed at a portion of the rod 124 adjacent to the joint member 125. A load detected by the force sensor 117 corresponds to a load acting on the occupant riding section 6 at a spot in the vicinity of the joint member 125.

The rocking actuator 113 is composed of, for example, an electric motor, and is installed to a pedestal plate 110a, which is located under the inner guide member 111 and which is formed inside the outer guide member 110, through the intermediary of a housing of a reduction gear 114. Further, the rotating shaft (not illustrated) of the rocking actuator 113 is connected to the screw portion 112a of the ball screw mechanism 112 through the intermediary of the reduction gear 114.

The screw portion 112a extends in the axial direction of the outer guide member 110 upward above the pedestal plate 110a, and is inserted into the inner guide member 111 through the opening at the lower end portion of the inner guide member 111. Further, the nut portion 112b fitted to the screw portion 112a is fixed to the lower end portion of the inner guide member 111.

Consequently, the nut portion 112b and the inner guide member 111 move in the axial direction with respect to the outer guide member 110 by rotatively driving the screw portion 112a of the ball screw mechanism 112 by the rocking actuator 113. With this, the amount of projection of the rod 124 projecting upward above the outer guide member 110 changes, leading to a change in the interval between the upper joint member 125 and the lower joint member 122 (hereinafter may be referred to as the actuator length of the actuator mechanism 105).

Further, the rocking actuator 113 is provided with an electric brake device 115 capable of non-rotatably locking the rotating shaft thereof by a frictional force or groove-ridge fitting or the like. The brake device 115 is configured to lock the rotating shaft of the rocking actuator 113 (consequently retaining the actuator length of the actuator mechanism 105 to be constant) when power is supplied. Further, the brake device 115 is configured to unlock the rotating shaft of the rocking actuator 113 when the power supply is cut off.

Each of the actuator mechanisms 105 is configured as described above. Consequently, the actuator length can be variably controlled for each of the actuator mechanisms 105 by controlling the rocking actuator 113 of the actuator mechanism 105.

The mechanical configuration of the mobile body 1C of the present embodiment is the same as that of the first embodiment except for the items described above. Therefore, the mobile body 1C differs from the mobile body 1A of the first embodiment in the configuration of a part of the connection mechanism 101 between the occupant riding section 6 and the lifting mechanism 45.

Supplementally, in the connection mechanism 101 of the present embodiment, the actuator mechanism 105 and the joint 102 are disposed above the lifting mechanism 45; however, the actuator mechanism 105 and the joint 102 may be disposed below the lifting mechanism 45, the upper end portion of the lifting mechanism 45 may be connected to the seat frame 64, and the lower end portion of the lifting mechanism 45 may be connected to the base body 3 through the intermediary of the actuator mechanism 105 and the joint 102.

A description will now be given of the configuration related to the operation control of the mobile body 1C of the present embodiment. As with the first embodiment, the mobile body 1C includes a control device 80 and a tilt sensor 81 mounted in the base body 3. The control device 80 receives command information related to the operation of the mobile body 1C from an operation unit 82, as with the first embodiment, in addition to detection signals of the tilt sensor 81. Further, according to the present embodiment, detection signals of a force sensor 117 of each of the actuator mechanisms 105 are also input to the control device 80.

Further, the control device 80 includes, as a function thereof, a movement control unit 80a, which controls the movement of the movement operation section 2, and a lifting control unit 80b, which controls the operation of the lifting mechanism 45, as with the first embodiment. The control processing of the movement control unit 80a and the lifting control unit 80b is the same as that of the first embodiment.

In the present embodiment, the control device 80 further includes a rocking control unit 80d that controls the operations of the rocking actuator 113 and the brake device 115 of each of the actuator mechanisms 105 thereby to control the rocking operation of the occupant riding section 6 with respect to the base body 3.

When the user P gets on or off the occupant riding section 6, the rocking control unit 80d operates each of the brake devices 115 to be in a locked state so as to maintain a constant actuator length of each of the actuator mechanisms 105 (so as to consequently maintain the occupant riding section 6 at a constant attitude with respect to the floor surface).

Further, when the mobile body 1C moves by the drive of the movement operation section 2, the rocking control unit 80d clears the locked state of each of the brake devices 115 and then operates the rocking actuator 113 of each of the actuator mechanisms 105 to change the actuator length for each of the actuator mechanisms 105 according to a load detected by the force sensor 117 of each of the actuator mechanisms 105.

In this case, the rocking actuator 113 of each of the actuator mechanisms 105 is operated such that the actuator length of the actuator mechanism 105 decreases as the load detected by the force sensor 117 of the actuator mechanism 105 (the load in a direction for decreasing the actuator length of the actuator mechanism 105) increases (more specifically, as the actuator length substantially linearly decreases as the load increases).

When the occupant riding section 6 is rocked from a reference attitude state (e.g., the attitude state illustrated in FIG. 14) with respect to the base body 3 by controlling the operation of the rocking actuator 113 of each of the actuator mechanisms 105, a load based on the amount of the rocking (a load in a direction for cancelling the rocking of the occupant riding section 6 with respect to the base body 3) is generated between the occupant riding section 6 and the plate 103 at the spot where each of the actuator mechanisms 105 is disposed. The load will be equivalent to a pseudo elastic force. Consequently, the occupant riding section 6 will be elastically rocked with respect to the base body 3, as with the mobile body 1A of the first embodiment.

Further, according to the present embodiment, the rocking control unit 80d controls the rocking actuator 113 of each of the actuator mechanisms 105 at a start of the movement of the mobile body 1C such that the rigidity related to the rocking between the occupant riding section 6 and the base body 3 is lower in an initial period of time during which the occupant riding section 6 is relatively raised with respect to the base body 3 (a period of time during which the movement operation section 2 lands on a floor surface and the auxiliary wheels 7 move upward off the floor surface) than the rigidity in a period of time after the operation of raising the occupant riding section 6 is completed.

To be specific, the rocking control unit 80d operates the rocking actuator 113 of each of the actuator mechanisms 105 such that the sensitivity to a change in the actuator length based on a change in the load detected by the force sensor 117 of each of the actuator mechanisms 105 (the change amount of the actuator length per unit change amount of the load) is higher in the initial period of time than that in the period of time after the completion of the operation of raising the occupant riding section 6 (the raising operation of the auxiliary wheels 7). This makes it possible to set the rigidity related to the rocking between the occupant riding section 6 and the base body 3 during the initial period of time to be lower than that in the period of time after the completion of the operation of raising the occupant riding section 6 (the operation of moving the auxiliary wheels 7 up). This enables the occupant riding section 6 to relatively rock with respect to the base body 3 with ease.

The present embodiment is the same as the first embodiment except for the items described above. The mobile body 1C of the present embodiment can also provide the same effect as the first embodiment.

In the present embodiment, the connection mechanism 101 is provided with the lifting mechanism 45. Alternatively, however, the lifting mechanism 45 may be omitted, and the plate 103 under the joint 102 may be fixed to the base body 3. Further, the occupant riding section 6 may be provided with the extendable leg mechanisms 90 described in the foregoing second embodiment in place of the legs 14 that connect the auxiliary wheels 7 to the occupant riding section 6.

Fourth Embodiment

Figure 18:
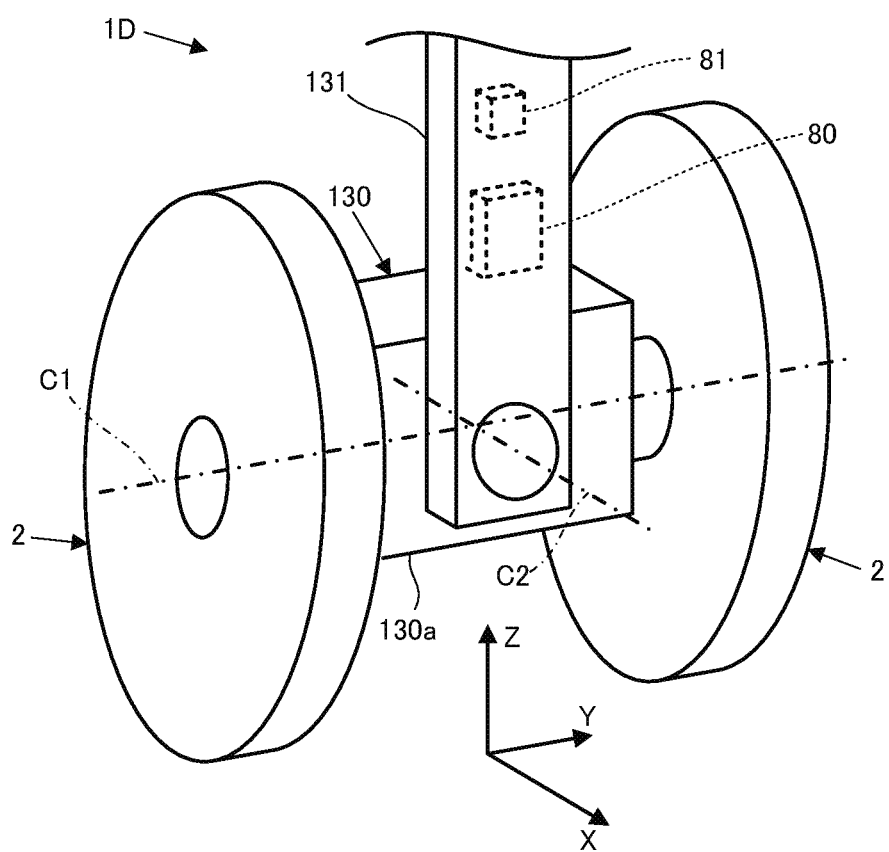
FIG. 18 is a perspective view schematically illustrating the configurations related to a movement operation section and a base body of a mobile body according to a fourth embodiment.

A description will now be given of a fourth embodiment of the present invention with reference to FIG. 18. The present embodiment differs from the first to the third embodiments in the configurations of the movement operation section and the base body, and the description of the same items as the first to the third embodiments will be omitted.

A mobile body 1D of the present embodiment includes two movement operation sections 2 having the same structure as the movement operation section 2 of the mobile body 1A of the first embodiment, and these movement operation sections 2, 2 are disposed side by side in the lateral direction (the Y-axis direction). In this case, the parallel direction (the Y-axis direction) of the movement operation sections 2, 2 is the direction of a rotation axis C1 of the rolling motion of each of the movement operation sections 2, 2. FIG. 18 schematically illustrates each movement operation section 2 as a wheel-shaped object.

A drive mechanism unit 130, which drives the movement operation sections 2.2, is installed between the movement operation sections 2, 2. The drive mechanism unit 130 is provided, for each movement operation section 2, with a drive mechanism having the same configuration as that of the drive mechanism 21 of the mobile body 1A of the first embodiment. Further, a housing body 130a of the drive mechanism unit 130 is rotatable around the rotation axis C1 of the rolling motion of the movement operation sections 2.2.

Further, the housing body 130a of the drive mechanism unit 130 pivotally supports a base body 131 such that the base body 131 can rock around an axis C2 in the longitudinal direction (the X-axis direction). Thus, the base body 131 can tilt about the two axes, namely, the axes C1 and C2, with respect to a floor surface with which the movement operation sections 2, 2 come in contact.

The base body 131 extends upward from a portion where the base body 131 is attached to the housing body 130a. Further, although not illustrated in FIG. 18, an occupant riding section 6 is connected to an upper part of the base body 131 through the intermediary of a connection mechanism having the same configuration as that of the connection mechanism 4 or 5 or 101 described in the first to the third embodiments. In addition, auxiliary wheels 7 (not illustrated) as auxiliary ground contact sections are connected to the occupant riding section 6, as with any one of the first to the third embodiments.

Further, the base body 131 includes a tilt sensor 81 and a control device 80. The control device 80 may be mounted in the drive mechanism unit 130.

In this case, the control of the movement of each of the movement operation sections 2 by the control device 80 is performed by the same control processing as that of the first embodiment. In this case, the moving speeds of the movement operation sections 2, 2 in the lateral direction (the direction of the axis C1) are controlled to the moving speeds that are identical to each other.

The mobile body 1D of the present embodiment is the same as any one of the first to the third embodiments except for the items described above. When the mobile body 1D of the present embodiment moves, although the movement operation sections 2, 2 do not tilt with respect to the floor surface, the base body 131 tilts with respect to the floor surface in response to the movement of the weight of an occupant or the like, as with the embodiments described above. Then, the movement operation sections 2, 2 move on the floor surface in response to the tilting.

The mobile body 1D of the present embodiment can provide the same effect as the effects of the foregoing embodiments, because the configuration of the connection between the base body 131 and the occupant riding section 6, and the configuration of the connection of the auxiliary wheels 7 to the occupant riding section 6 are the same as those of one of the first to the third embodiments.

Fifth Embodiment

Figure 19:
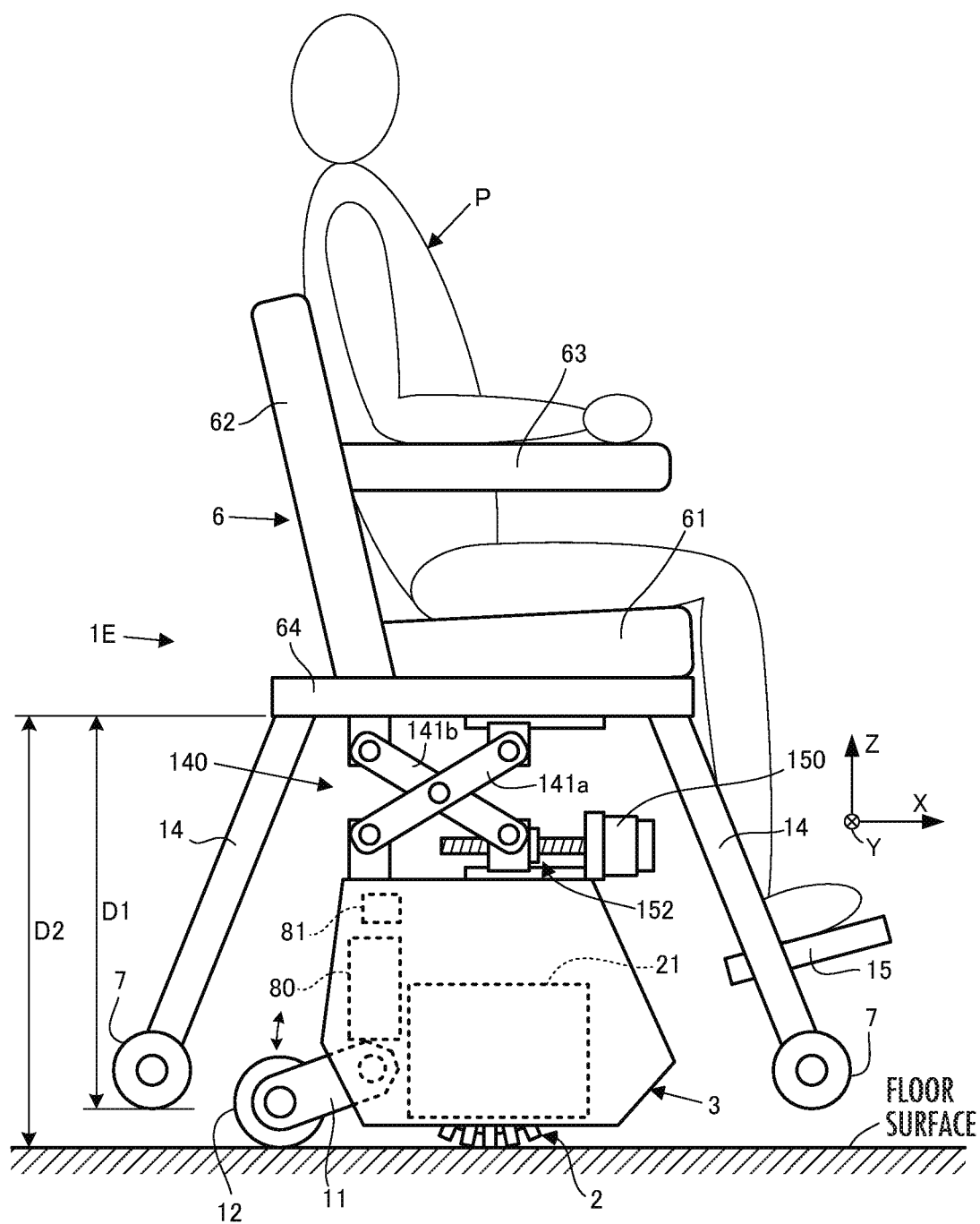
FIG. 19 is a side view illustrating a mobile body according to a fifth embodiment, a movement operation section thereof being in contact with the ground.

A description will now be given of a fifth embodiment of the present invention with reference to FIG. 19 to FIG. 20C. The present embodiment differs from the first embodiment in the configuration of a connection mechanism, and a description of the same items as those in the first embodiment will be omitted.

Figure 20A:
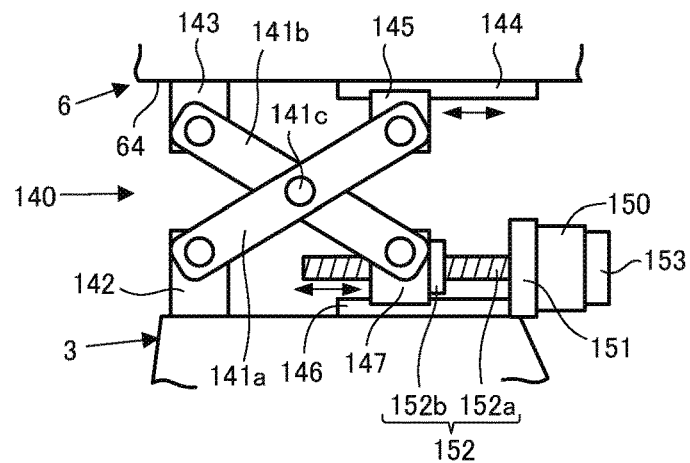
FIG. 20A to FIG. 20C are diagrams illustrating the configuration and the operation of a connection mechanism provided in the mobile body according to the fifth embodiment.
Figure 20B:
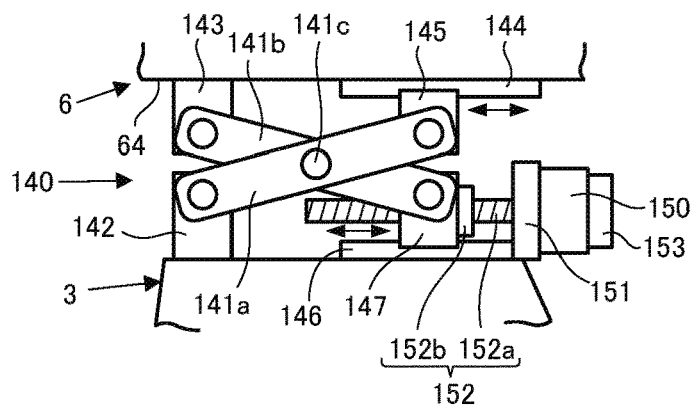

In a mobile body 1E, an occupant riding section 6 is liftably connected to a base body 3 through the intermediary of a connection mechanism 140 having a structure similar to a pantograph. The connection mechanism 140 includes a pair of links 141a. 141b obliquely extending in the vertical direction, crossing in an X shape between a seat frame 64 and the base body 3, as illustrated in FIG. 20A and FIG. 20B. These links 141a, 141b are connected through a shaft pin 141c such that the links 141a. 141b can relatively rotate at the crossing portion thereof.

Further, the lower end portion of the link 141a is rotatably and pivotally supported by a bearing 142 fixedly installed to the base body 3, and the upper end portion of the link 141b is rotatably and pivotally supported by a bearing 143 fixedly installed to the seat frame 64 of the occupant riding section 6.

Further, the upper end portion of the link 141a is rotatably and pivotally supported by a bearing 145 which is engaged with a guide rail 144 fixedly installed to the seat frame 64 and which is movable along the guide rail 144. Further, the lower end portion of the link 141b is rotatably and pivotally supported by a bearing 147 which is engaged with a guide rail 146 fixedly installed to the base body 3 and which is movable along the guide rail 146.

In this case, the extension directions of the guide rails 144, 146 are set to directions that are parallel to each other such that, as the links 141a, 141b relatively rotate about the axis of the shaft pin 141c, the upper end portion of the link 141a moves forward or rearward with respect to the upper end portion of the link 141b, and the lower end portion of the link 141b moves forward or rearward with respect to the lower end portion of the link 141a.

Consequently, moving the bearing 145 or 147 of one of the bearings 145 and 147 along the guide rail 144 or 146 causes the other bearing 147 or 145 to move in the same direction as the one bearing 145 or the 147, and the links 141a. 141b to relatively rotate about the axis of the shaft pin 141c. As the links 141a, 141b relatively rotate, the entire links 141a, 141b extend or retract in the vertical direction, consequently causing the occupant riding section 6 to be relatively raised or lowered with respect to the base body 3. FIG. 20A illustrates a state in which the occupant riding section 6 has been relatively raised with respect to the base body 3, and FIG. 20B illustrates a state in which the occupant riding section 6 has been relatively lowered with respect to the base body 3.

Further, according to the present embodiment, the links 141a. 141b are composed of an elastic material to enable the links 141a, 141b to elastically bend. Hence, in a state in which the movement of the bearings 145, 147 is suspended, the elastic bending of one or both of the links 141a, 141b enables the occupant riding section 6 to elastically rock with respect to the base body 3, as illustrated in, for example, FIG. 20C. Thus, the links 141a, 141b constitute extendable elastic members in the present invention.

Figure 20C:
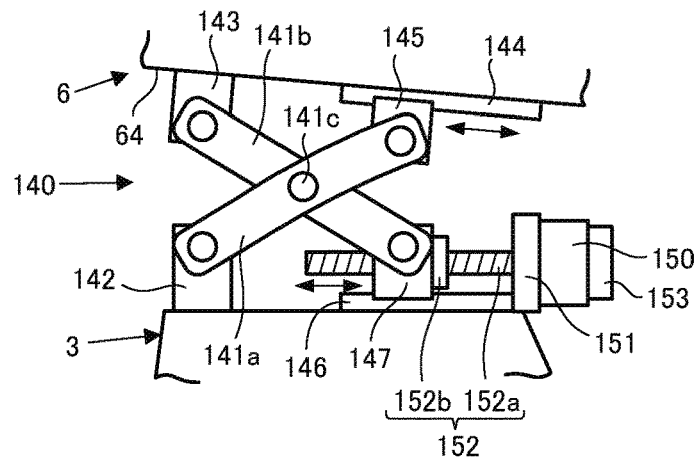

FIG. 20C illustrates a state in which the occupant riding section 6 is elastically rocking in the forward tilt direction with respect to the base body 3. The occupant riding section 6 can elastically rock in any direction, including a rearward tilt direction, a leftward tilt direction, and a rightward tilt direction with respect to the base body 3 by the elastic bending of one or both of the links 141a, 141b.

The connection mechanism 140 further includes a lifting actuator 150 for relatively raising or lowering the occupant riding section 6 with respect to the base body 3. The lifting actuator 150 transmits a driving force for moving one of the bearings 145 and 147, e.g., the bearing 147 adjacent to the base body 3, along the guide rail 146, to the bearing 147. Consequently, the lifting actuator 150 relatively rotates the links 141a, 141b so as to relatively raise or lower the occupant riding section 6 with respect to base body 3.

To be specific, the lifting actuator 150 is composed of, for example, an electric motor. Further, a rotating shaft (not illustrated) of the lifting actuator 150 is connected to a screw portion 152a of a ball screw mechanism 152 through the intermediary of a reduction gear 151. In this case, the housing of each of the lifting actuator 150 and the reduction gear 151 is fixed to the base body 3 through a bracket or the like (not illustrated). Further, the bearing 147 is fixed to a nut portion 152b fitted to the screw portion 152a of the ball screw mechanism 152, or is configured integrally with the nut portion 152b.

Consequently, rotatively driving the screw portion 152a of the ball screw mechanism 152 by the lifting actuator 150 causes the nut portion 152b and the bearing 147 to move along the guide rail 146. With this, the links 141a. 141b relatively rotate, causing the occupant riding section 6 to be relatively raised or lowered with respect to the base body 3.

The transmission of motive power from the lifting actuator 150 to the bearing 147 can alternatively be performed by a rotation-linear motion conversion mechanism other than the ball screw mechanism 152. Further, the lifting actuator 150 can be composed of a linear motion actuator, and the bearing 147 can be directly moved along the guide rail 146 by the linear motion actuator. These apply also to a case where motive power is transmitted from the lifting actuator to the bearing 145 in place of the bearing 147.

The lifting actuator 150 is provided with an electric brake device 153 capable of non-rotatably locking the rotating shaft of the lifting actuator 150 by a frictional force or groove-ridge fitting or the like. As with the brake device 57 of the first embodiment, the brake device 153 is configured to lock the rotating shaft of the lifting actuator 150 (i.e., a state in which the relative raising/lowering of the occupant riding section 6 with respect to the base body 3 is locked) when power is supplied. Further, the brake device 153 is configured to clear the locked state when the power supply is cut off.

The configuration of the mobile body 1E of the present embodiment is the same as that of the mobile body 1A of the first embodiment except for the items described above. Further, a control device 80 of the mobile body 1E of the present embodiment operates the lifting actuator 150 and the brake device 153 to set a state in which the occupant riding section 6 is relatively lowered with respect to the base body 3 (a D1>D2 state) when, for example, a user P gets on or off the mobile body 1E, as with the first embodiment. Thus, when the mobile body 1E is in the standby state, a movement operation section 2 is held above a floor surface and a plurality of auxiliary wheels 7 are in contact with the floor surface. Consequently, the occupant riding section 6 is supported above the floor surface through the intermediary of the auxiliary wheels 7 such that the occupant riding section 6 maintains a constant attitude with respect to the floor surface.

Further, when the mobile body 1E moves, the control device 80 operates the lifting actuator 150 and the brake device 153 to set a state in which the occupant riding section 6 is relatively raised with respect to the base body 3 (a D1<D2 state). This causes the movement operation section 2 to come in contact with the floor surface and the plurality of auxiliary wheels 7 to move upward off the floor surface. Then, the control device 80 controls the movement of the movement operation section 2 through the movement actuators 22a, 22b, as with the first embodiment.

In this case, one or both of the links 141a. 141b elastically bend, enabling the occupant riding section 6 to elastically rock with respect to the base body 3. Therefore, the mobile body 1E of the present embodiment can also provide the same effect as the first embodiment described in relation to the first embodiment with reference to FIG. 7 to FIG. 9.

Further, if an abnormality of the mobile body 1E occurs in the state in which the auxiliary wheels 7 are held above the floor surface (the D1<D2 state) or the user P performs a predetermined operation through an operation unit 82, then the control device 80 cuts off the supply of power to the brake device 153 thereby to lower the occupant riding section 6 with respect to the base body 3 to consequently bring the plurality of auxiliary wheels 7 into contact with the floor surface, as with the first embodiment. This leads to a state in which the attitude of the occupant riding section 6 with respect to the floor surface is maintained to be constant.

Although not illustrated in the mobile body 1E of the present embodiment, the mobile body 1E may be provided with a spring (elastic member) that urges the occupant riding section 6 in a direction for relative lowering with respect to the base body 3, or a damper that generates viscous resistance in a braking direction when the occupant riding section 6 relatively lowers with respect to the base body 3, as with the mobile body 1A of the first embodiment.

For example, a coil spring that urges the bearings 142 and 147 in directions for separating from each other and a damper that generates a braking force at the time of the separation from each other may be interposed between the bearings 142 and 147 of the connection mechanism 140. Alternatively, the coil spring and the damper may be interposed between the bearings 143 and 145.

With this arrangement, if an abnormality of the mobile body 1E occurs in the state in which the auxiliary wheels 7 are held above the floor surface (the D1<D2 state) or if the user P performs a predetermined operation through the operation unit 82, the impact at the time of the landing of the auxiliary wheels 7 due to the lowering of the occupant riding section 6 can be reduced. In addition, the ground contact load on the movement operation section 2 after the auxiliary wheels 7 land can be reduced to be sufficiently small or zero.

In the connection mechanism 140 of the mobile body 1E of the present embodiment, only one pair of the links 141a, 141b is provided; however, a plurality of pairs of links 141a. 141b may be arranged side by side between the occupant riding section 6 and the base body 3. Further, a plurality of pairs of links 141a. 141b may be linked in the vertical direction in a plurality of stages between the occupant riding section 6 and the base body 3. In addition, the movement operation section and the base body may be configured in the same manner as, for example, the fourth embodiment.

Sixth Embodiment

Figure 21:
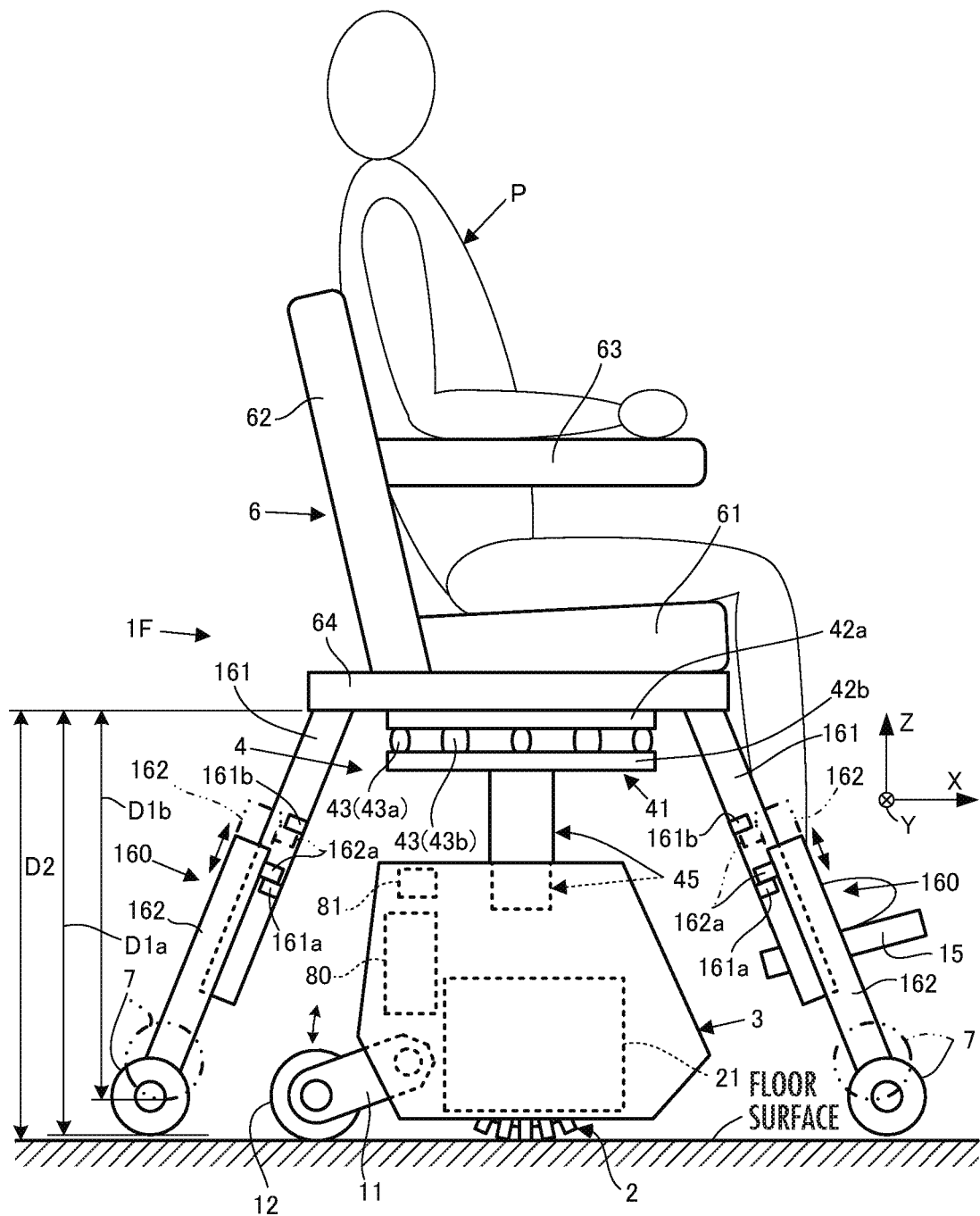
FIG. 21 is a side view illustrating a mobile body according to a sixth embodiment, a movement operation section thereof being in contact with the ground.

A description will now be given of a sixth embodiment of the present invention with reference to FIG. 21. The present embodiment differs from the first embodiment in the configuration of legs, and a description of the same items as those of the first embodiment will be omitted.

In a mobile body 1F of the present embodiment, each of legs 160 that connect auxiliary wheels 7 to an occupant riding section 6 is divided to an upper leg 161 and a lower leg 162, and the upper end portion of the upper leg 161 is fixed to a seat frame 64 of the occupant riding section 6.

Further, the lower leg 162 is engaged with the upper leg 161 in such a manner as to be slidable within a predetermined segment along an extension direction of the upper leg 161 (obliquely vertical direction). Further, the auxiliary wheels 7 are attached to the lower end portions of the lower legs 162, as with the first embodiment. Thus, each of the auxiliary wheels 7 is connected to the occupant riding section 6 through the intermediary of each of the legs 160 such that the auxiliary wheel 7 has a play over the predetermined segment.

In each of the legs 160 illustrated as examples, the play segment of each of the auxiliary wheels 7 with respect to the occupant riding section 6 (i.e., the play segment of the slide of the lower leg 162 with respect to the upper leg 161) is, for example, the segment between a lower end position where an abutting portion 162a fixed to the lower leg 162 comes in contact with a stopper 161a fixed to a lower side of the upper leg 161 as indicated by the solid line and an upper end position where the abutting portion 162a comes in contact with a stopper 161b fixed to an upper side of the upper leg 161 as indicated by the two-dot chain line.

Here, according to the mobile body 1F of the present embodiment, the occupant riding section 6 is raised or lowered with respect to a base body 3 in the same manner as the first embodiment. In a standby state when a user P gets on or off the mobile body 1F, the occupant riding section 6 is relatively lowered to a predetermined height position with respect to the base body 3. Further, when moving by a movement operation section 2, the occupant riding section 6 is relatively raised to a predetermined height position with respect to the base body 3.

Further, the upper end position of the play segment of each of the auxiliary wheels 7 with respect to the occupant riding section 6 (the play segment of the lower leg 162 of each of the legs 160 with respect to the upper leg 161) is set such that, in the standby state of the mobile body 1F of the present embodiment, the abutting portion 162a of the lower leg 162 of each of the legs 160 is in contact with the stopper 161b on the upper side of the upper leg 161, and the auxiliary wheels 7 around the occupant riding section 6 are in contact with a floor surface (i.e., a state in which the attitude of the occupant riding section 6 with respect to the floor surface is maintained to be constant) while being subjected to a ground contact load (the ground contact load supporting the mobile body 1F on the floor surface).

The upper end position of the play segment of each of the auxiliary wheels 7 is set such that, for example, a distance D1b from the occupant riding section 6 to the lower end of each of the auxiliary wheels 7 in a state in which the auxiliary wheel 7 has moved to the upper end position of the play segment is the same as the distance D1 in the first embodiment.

In the mobile body 1F illustrated as an example, the lower end position of the play segment of each of the auxiliary wheels 7 is set such that the auxiliary wheel 7 at the lower end portion of each of the legs 160 is held slightly above a floor surface (i.e., such that a distance D1a from the occupant riding section 6 to the lower end of the auxiliary wheel 7 is slightly smaller than a distance D2 to the lower end of a movement operation section 2) when the occupant riding section 6 is not tilted in a state in which the occupant riding section 6 has been relatively raised with respect to the base body 3 to a predetermined height position when the mobile body 1F is moved by the movement operation section 2. Alternatively, however, the lower end position of the play segment of each of the auxiliary wheels 7 may be further lowered such that the auxiliary wheels 7 come in contact with the floor surface by the gravity acting on the auxiliary wheels 7 and the lower legs 162.

The configuration of the mobile body 1F of the present embodiment is the same as that of the first embodiment except for the items described above. Further, the operations of the movement actuators 22a, 22b and the lifting actuator 55 and the brake device 57 are controlled by a control device 80 in the same manner as the first embodiment.

According to the mobile body 1F of the present embodiment, in the state in which each of the auxiliary wheels 7 has not reached the upper end position of the play segment, even when the auxiliary wheels 7 come in contact with the floor surface, the lower legs 162 to which the auxiliary wheels 7 are attached can slide with respect to the upper legs 161, being hardly subjected to resistance, so that the ground contact load acting on the auxiliary wheels 7 remains sufficiently small. Therefore, the state in which the lower leg 162 of each of the legs 160 has not reached the upper end position of the play segment is substantially equivalent to the state in which the auxiliary wheels 7 at the distal end portions of the legs 160 are held above the floor surface.

Consequently, the mobile body 1F of the present embodiment can also provide the same effect as the mobile body 1A of the first embodiment.

In the present embodiment, a connection mechanism 4 between the occupant riding section 6 and the base body 3 is the same as that of the first embodiment; however, the connection mechanism may be the same as that of, for example, the third embodiment or the fifth embodiment described above. Further, the connection mechanism may be the same as that of the second embodiment, and the configuration of the upper leg 161 of each of the legs 160 may be the same as the leg mechanism 90 of the second embodiment. In addition, the movement operation section and the base body may have the same configurations as those of, for example, the fourth embodiment.

Other Embodiments

The present invention is not limited to the embodiments described above. Several other embodiments will be described below.

In the embodiments described above, the movement operation section 2 is movable on a floor surface in all directions; however, the movement operation section of a mobile body according to the present invention may be movable, for example, only in one direction (a longitudinal direction or the like). In addition, the movement operation section may be composed of, for example, two wheels arranged side by side. Further, the two wheels may be driven such that the mobile body moves straight forward or rearward according to the tilting of the base body in the longitudinal direction (tilting in a direction about the axis in the lateral direction), and the two wheels may be driven to turn the mobile body (by imparting a difference in speed between the two wheels) according to the tilting of the base body in the lateral direction (tilting in the direction about the axis in the longitudinal direction).

Further, the occupant riding section is not limited to the seat shape, and may be configured such that, for example, a user (occupant) can ride, standing.

In addition, the mobile bodies 1A to 1D of the embodiments are provided with the plurality of auxiliary wheels 7 as the auxiliary ground contact sections; however, the auxiliary ground contact sections may be configured to slide on a floor surface when coming in contact with the floor surface (like, for example, ski boards). In this case, it is possible to apply an appropriate braking force when the auxiliary ground contact sections slide on the floor surface by the material or the bottom surface shape of the auxiliary ground contact sections.

Further, in the foregoing embodiments, the auxiliary ground contact sections (auxiliary wheels 7) are connected to the occupant riding section 6 by the legs 14 or the extendable leg mechanisms 90. However, for example, a skirt-shaped cover member may be extendedly provided downward from the peripheral edge of the occupant riding section 6, and a plurality of auxiliary ground contact sections may be attached to or formed on the lower end portion of the cover member.

Further, in the embodiments, the occupant riding section 6 is connected such that the occupant riding section 6 can be relatively raised or lowered with respect to the base body 3, or the auxiliary ground contact sections (the auxiliary wheels 7) are connected such that the auxiliary ground contact sections can be moved with respect to the occupant riding section 6. However, a mobile body in accordance with the present invention may not be provided with a mechanism that relatively raises or lowers the occupant riding section with respect to the base body or a mechanism that moves the auxiliary ground contact sections with respect to the occupant riding section. For example, in the mobile body 1A of the first embodiment, the lower plate 42b of the elastic structure 41 may be fixed to the base body 3 as with the mobile body 1B in the second embodiment.

Further, the first embodiment has illustrated an example in which the occupant riding section 6 is raised or lowered with respect to the base body 3 by the driving force of the lifting actuator 55; alternatively, however, the lifting mechanism may be a manual type.

Further, the second embodiment has illustrated an example in which the leg mechanisms 90 are extended or retracted (the auxiliary ground contact sections (the auxiliary wheels 7) are moved with respect to the occupant riding section 6) by the driving force of the extension/retraction actuator 96; however, the extension/retraction mechanism may be a manual type.

Further, in the foregoing sixth embodiment, the lower leg 162 of each of the legs 160 slides against the upper leg 161 in the foregoing play segment. Alternatively, however, the lower leg 162 and the upper leg 161 may be connected through the intermediary of a link mechanism such that the lower leg 162 is movable with respect to the upper leg 161.

Further, the foregoing sixth embodiment may be adapted such that, if, for example, an abnormality occurs or an occupant issues a request for an emergency stop, the play mechanism between the lower leg 162 and the upper leg 161 of each of the legs 160 is locked to a state at that particular moment (the relative movement between the lower leg 162 and the upper leg 161 being locked) by an appropriate locking mechanism. In addition, at the time of locking, the lifting mechanism 45 may be operated to decrease the distance between the base body 3 and the occupant riding section 6 thereby to cause the auxiliary wheels 7 (auxiliary ground contact sections) to quickly come in contact with the ground under a ground contact load. Further, in this case, the play mechanism may be automatically switched between a locked mode and an unlocked mode according to a movement condition of a mobile body, a road surface condition or other conditions.

The invention claimed is:

1. A mobile body comprising:
a movement operation section capable of moving in all directions on a floor surface;
a base body assembled to the movement operation section in such a manner as to be tiltable with respect to the floor surface;
an occupant riding section mounted to the base body through an intermediary of a connection mechanism such that the occupant riding section can rock with respect to the base body;
an auxiliary ground contact section which is connected to the occupant riding section in such a manner as to tilt together with the occupant riding section with respect to the floor surface, which is placed in a state in which a ground contact load for preventing further tilting of the occupant riding section can be generated in a case where an amount of tilting of the occupant riding section with respect to the floor surface increases to a predetermined amount, and which is configured to be capable of sliding or rolling on the floor surface in the state; and
a stabilization control device which controls the movement of the movement operation section such that an attitude of at least the mobile body is stabilized in a state in which an occupant is riding on the occupant riding section,
wherein the connection mechanism is configured to elastically rock the occupant riding section with respect to the base body according to the movement of a center of gravity of the occupant riding on the occupant riding section.

2. The mobile body according to claim 1,
wherein the connection mechanism is provided with an elastic member as a constituent element for elastically rocking the occupant riding section with respect to the base body.

3. The mobile body according to claim 1,
wherein the connection mechanism is provided with a rocking actuator, which operates to rock the occupant riding section with respect to the base body according to a load acting on the occupant riding section, as a constituent element for elastically rocking the occupant riding section with respect to the base body.

4. The mobile body according to claim 1,
wherein the auxiliary ground contact section is configured such that a braking force is applied in the case where the auxiliary ground contact section slides or rolls on the floor surface.

5. The mobile body according to claim 1,
wherein the occupant riding section can be tilted in a pitch direction with respect to the floor surface, and the auxiliary ground contact section is disposed each at a front and rear of the occupant riding section.

6. The mobile body according to claim 1,
wherein the occupant riding section can be tilted in a rolling direction with respect to the floor surface, and the auxiliary ground contact section is disposed each on a left side and a right side of the occupant riding section.

7. The mobile body according to claim 1,
wherein the connection mechanism is configured to be capable of relatively raising/lowering the occupant riding section with respect to the base body in addition to elastically rocking the occupant riding section with respect to the base body.

8. The mobile body according to claim 7,
wherein the connection mechanism includes an expandable elastic member interposed between the occupant riding section and the base body as a constituent element for elastically rocking the occupant riding section with respect to the base body, and is configured to enable the occupant riding section to be relatively raised/lowered with respect to the base body by expansion/contraction of the elastic member.

9. The mobile body according to claim 7,
wherein the auxiliary ground contact section is connected to the occupant riding section in such a manner as to approach the floor surface and come in contact with the floor surface as the occupant riding section relatively lowers with respect to the base body, and is configured to support the occupant riding section, while maintaining the attitude of the occupant riding section with respect to the floor surface to be constant in a state in which the auxiliary ground contact section is in contact with the floor surface.

10. The mobile body according to claim 9, further including:
a first spring member connected to the base body and the occupant riding section in such a manner as to urge the base body in a direction for being relatively raised with respect to the occupant riding section in the state in which the auxiliary ground contact section is in contact with the ground due to relative lowering of the occupant riding section with respect to the base body.

11. The mobile body according to claim 9,
wherein the connection mechanism is configured such that rigidity thereof related to the rocking of the occupant riding section with respect to the base body is lower in the state in which the auxiliary ground contact section is in contact with the ground due to the relative lowering of the occupant riding section with respect to the base body than in a state in which the auxiliary ground contact section is not in contact with the floor surface.

12. The mobile body according to claim 7, further including:
a locking mechanism that locks relative raising/lowering of the occupant riding section with respect to the base body.

13. The mobile body according to claim 12, further including:
a second spring member connected to the base body and the occupant riding section so as to urge the occupant riding section relatively in a lowering direction with respect to the base body, wherein the locking mechanism is configured to release the locking of the raising/lowering of the occupant riding section with respect to the base body in case of occurrence of a predetermined abnormality of the mobile body or in response to an operation through a predetermined operation unit.

14. The mobile body according to claim 1,
wherein the auxiliary ground contact section is connected to the occupant riding section in such a manner as to be relatively movable with respect to the occupant riding section in a direction for approaching the floor surface.

15. The mobile body according to claim 14,
wherein the auxiliary ground contact section is connected to the occupant riding section in such a manner as to be enabled to come in contact with the floor surface by relative movement with respect to the occupant riding section, and is configured to support the occupant riding section, maintaining the attitude of the occupant riding section to be constant with respect to the floor surface in the state in which the auxiliary ground contact section is in contact with the floor surface.

16. The mobile body according to claim 15, further including:
a first spring member connected to the auxiliary ground contact section and the occupant riding section in such a manner as to urge the occupant riding section in a direction in which the occupant riding section is relatively raised with respect to the auxiliary ground contact section in a state in which the auxiliary ground contact section is in contact with the ground by relative movement of the auxiliary ground contact section with respect to the occupant riding section.

17. The mobile body according to claim 15,
wherein the connection mechanism is configured such that rigidity thereof related to the rocking of the occupant riding section with respect to the base body is lower in the state in which the auxiliary ground contact section is in contact with the ground due to the relative movement of the auxiliary ground contact section with respect to the occupant riding section than in a state in which the auxiliary ground contact section is not in contact with the floor surface.

18. The mobile body according to claim 14, further including:
a locking mechanism that locks relative movement of the auxiliary ground contact section with respect to the occupant riding section.

19. The mobile body according to claim 18, further including:
a second spring member connected to the auxiliary ground contact section and the occupant riding section so as to urge the occupant riding section in a direction for bringing the auxiliary ground contact section close to the floor surface, wherein the locking mechanism is configured to release the locking of the relative movement of the auxiliary ground contact section with respect to the occupant riding section in case of occurrence of a predetermined abnormality of the mobile body or in response to an operation through a predetermined operation unit.

20. The mobile body according to claim 1,
wherein the movement operation section is configured by connecting two movement operation sections that can move in all directions on the floor surface.

21. A mobile body comprising:
a movement operation section capable of moving on a floor surface;
a base body assembled to the movement operation section in such a manner as to be capable of tilting with respect to the floor surface;
an occupant riding section installed to the base body; and
an auxiliary ground contact section which is connected to the occupant riding section in such a manner as to tilt together with the occupant riding section with respect to the floor surface thereby to change a height from the floor surface, which is disposed each at a front and rear of the occupant riding section, and which comes in contact with the floor surface in a slidable or rollable manner so as to prevent the occupant riding section from tilting further in a case where an amount of tilting of the occupant riding section in a forward tilt direction or a rearward tilt direction with respect to the floor surface increases to a predetermined amount,
wherein the occupant riding section and the auxiliary ground contact section tilt forward and the base body tilt rearward as an advancing speed of the movement operation section increases in a steady state in which the movement operation section advances on the floor surface.

* * * * *